(12) United States Patent
Raveendran et al.

(10) Patent No.: US 8,832,328 B2
(45) Date of Patent: Sep. 9, 2014

(54) DATA REDIRECTION FOR UNIVERSAL SERIAL BUS DEVICES

(71) Applicant: QUALCOMM Incorporated, San Diego, CA (US)

(72) Inventors: Vijayalakshmi R. Raveendran, San Diego, CA (US); Xiaodong Wang, San Diego, CA (US); Xiaolong Huang, San Diego, CA (US); Jeffree S. Froelicher, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 13/709,823

(22) Filed: Dec. 10, 2012

(65) Prior Publication Data
US 2013/0246663 A1    Sep. 19, 2013

Related U.S. Application Data

(60) Provisional application No. 61/610,247, filed on Mar. 13, 2012, provisional application No. 61/611,314, filed on Mar. 15, 2012.

(51) Int. Cl.
*G06F 3/00* (2006.01)
*G06F 13/00* (2006.01)
*G06F 9/44* (2006.01)
*G06F 13/40* (2006.01)

(52) U.S. Cl.
CPC .......... *G06F 9/4411* (2013.01); *G06F 13/4022* (2013.01); *G06F 2213/4002* (2013.01)
USPC .................................. 710/8; 710/33

(58) Field of Classification Search
None
See application file for complete search history.

(56) References Cited

U.S. PATENT DOCUMENTS

| | | | |
|---|---|---|---|
| 6,189,040 B1 | 2/2001 | Oohara | |
| 7,200,685 B2 | 4/2007 | Uemura | |
| 7,783,794 B2 | 8/2010 | Hung | |
| 7,873,028 B2 | 1/2011 | Lam et al. | |
| 8,190,785 B2 | 5/2012 | Hill et al. | |
| 8,215,991 B2 | 7/2012 | Bryant-Rich | |
| 2005/0055479 A1* | 3/2005 | Zer et al. | 710/22 |
| 2011/0185087 A1 | 7/2011 | Khan et al. | |

FOREIGN PATENT DOCUMENTS

JP    H11284636 A    10/1999

OTHER PUBLICATIONS

International Search Report and Written Opinion—PCT/US2013/030877—ISA/EPO—Aug. 5, 2013.

* cited by examiner

*Primary Examiner* — Idriss N Alrobaye
*Assistant Examiner* — Richard B Franklin
(74) *Attorney, Agent, or Firm* — Donald C. Kordich

(57) ABSTRACT

Aspects of this disclosure relate to data transfer. In an example, aspects of this disclosure include a method that includes generating, at a host device, a Universal Serial Bus (USB) redirect configuration request for establishing a connection between a first USB device connected to a USB hub and a second USB device connected to the USB hub, wherein the connection between the first USB device and the second USB device does not include the host device. The method also includes requesting, after the connection between the first USB device and the second USB device has been established, data to be routed from the first USB device to the second USB device via the USB hub.

54 Claims, 11 Drawing Sheets

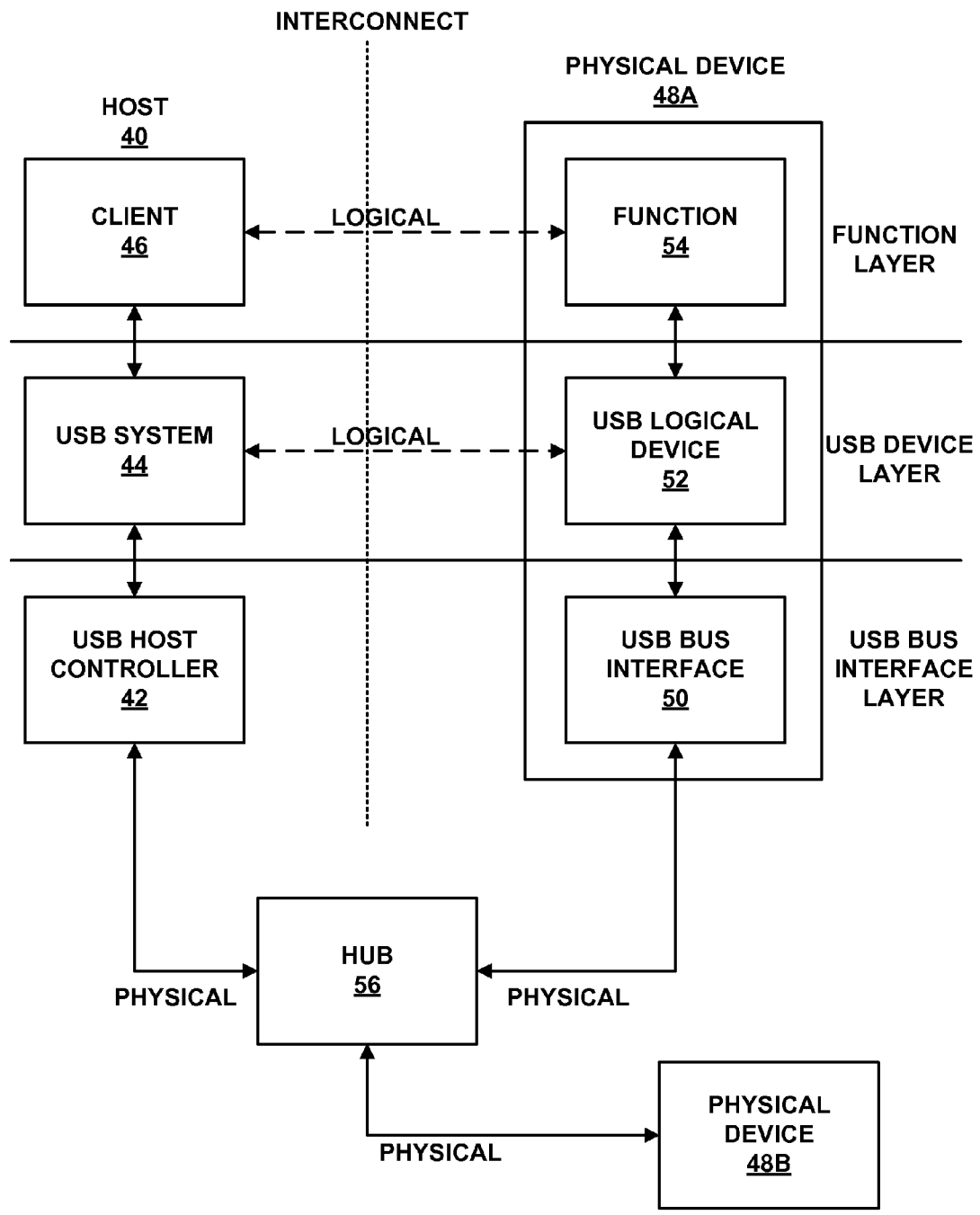
FIG. 3

DATA REDIRECTION FOR UNIVERSAL SERIAL BUS DEVICES

This disclosure claims benefit of U.S. Provisional Application No. 61/610,247 filed Mar. 13, 2012, and U.S. Provisional Application No. 61/611,314 filed Mar. 15, 2012, the entire contents of which are incorporated by reference herein.

TECHNICAL FIELD

This disclosure relates to wireless communication techniques.

BACKGROUND

Mobile devices may take the form of mobile telephones, tablet computers, laptop computers, portable computers with wireless communication cards, personal digital assistants (PDAs), digital cameras, video gaming devices, portable media players, flash memory devices with wireless communication capabilities, wireless communication devices including so-called "smart" phones and "smart" pads or tablets, e-readers, or other of a wide variety of other types of portable devices. Mobile devices are becoming increasingly powerful with the addition of high-power processors, the capability to process media content, and the ability to interact with networks in the cloud. These improvements make it possible to develop new usage models for the mobile devices that provide a better user experience and improve productivity.

In addition, mobile devices and other computing devices (e.g., personal computers, mobile telephones, electronic handheld devices, gaming consoles, or other similar devices) may communicate with a variety of periphery devices using communication standard. One such communication standard includes a Universal Serial Bus (USB) connection. Some examples of peripheral devices that may use a USB connection include mice, keyboards, digital cameras, printers, personal media players, mass storage devices such as flash drives, network adapters, and external hard drives. For many of those devices, USB has become a very common communication standard that facilitates peripheral device connection.

SUMMARY

The techniques of this disclosure generally relate to techniques for transferring data between electronic devices. For example, the techniques of this disclosure may limit an amount of data that is exchanged and/or a frequency with which data is exchanged between a host device and one or more other devices connected to the host device via a hub. According to some aspects, the devices may communicate via a Universal Serial Bus (USB) connection. Accordingly, the devices may generally be referred to as a USB host, a USB hub, and a USB device. Aspects of this disclosure relate to techniques for streamlining communication between USB devices connected to a USB hub in a way that limits interactions with a USB host device. For example, rather than the host device facilitating all communication of data between USB devices connected to a USB hub, the techniques of this disclosure allow data to be redirected to provide a more direct exchange of data between USB devices that are connected to the USB hub.

In an example, aspects of this disclosure relate to a method for transferring data that includes generating, at a host device, a Universal Serial Bus (USB) redirect configuration request for establishing a connection between a first USB device connected to a USB hub and a second USB device connected to the USB hub, wherein the connection between the first USB device and the second USB device does not include the host device, and requesting, after the connection between the first USB device and the second USB device has been established, data to be routed from the first USB device to the second USB device via the USB hub.

In another example, aspects of this disclosure relate to an apparatus for transferring data, the apparatus comprising one or more processors configured to generate a Universal Serial Bus (USB) redirect configuration request for establishing a connection between a first USB device connected to a USB hub and a second USB device connected to the USB hub, wherein the connection between the first USB device and the second USB device does not include the host device, and request, after the connection between the first USB device and the second USB device has been established, data to be routed from the first USB device to the second USB device via the USB hub.

In another example, aspects of this disclosure relate to an apparatus for transferring data that includes means for generating a Universal Serial Bus (USB) redirect configuration request for establishing a connection between a first USB device connected to a USB hub and a second USB device connected to the USB hub, wherein the connection between the first USB device and the second USB device does not include the host device, and means for requesting, after the connection between the first USB device and the second USB device has been established, data to be routed from the first USB device to the second USB device via the USB hub.

In another example, aspects of this disclosure relate to a non-transitory computer-readable medium storing instructions that, when executed, cause one or more processors to generate a Universal Serial Bus (USB) redirect configuration request for establishing a connection between a first USB device connected to a USB hub and a second USB device connected to the USB hub, wherein the connection between the first USB device and the second USB device does not include the host device, and request, after the connection between the first USB device and the second USB device has been established, data to be routed from the first USB device to the second USB device via the USB hub.

In another example, aspects of this disclosure relate to a method for transferring data that includes generating a Universal Serial Bus (USB) redirect configuration message for transmission to a USB host for establishing a connection between a first USB device and a second USB device, wherein the connection between the first USB device and the second USB device does not include the USB host, receiving a request to transfer data between the first USB device and the second USB device, and transmitting, after receiving the request, data between the first USB device and the second USB device using the connection and without transferring at least a portion of the data to the USB host.

In another example, aspects of this disclosure relate to an apparatus for transferring data comprising one or more processors configured to generate a Universal Serial Bus (USB) redirect configuration message for transmission to a USB host for establishing a connection between a first USB device and a second USB device, wherein the connection between the first USB device and the second USB device does not include the USB host, receive a request to transfer data between the first USB device and the second USB device, and transmit, after receiving the request, data between the first USB device and the second USB device using the connection and without transferring at least a portion of the data to the USB host.

In another example, aspects of this disclosure relate to an apparatus for transferring data that includes means for generating a Universal Serial Bus (USB) redirect configuration message for transmission to a USB host for establishing a connection between a first USB device and a second USB device, wherein the connection between the first USB device and the second USB device does not include the USB host, means for receiving a request to transfer data between the first USB device and the second USB device, and means for transmitting, after receiving the request, data between the first USB device and the second USB device using the connection and without transferring at least a portion of the data to the USB host.

In another example, aspects of this disclosure relate to a non-transitory computer-readable medium storing instructions that, when executed, cause one or more processors to generate a Universal Serial Bus (USB) redirect configuration message for transmission to a USB host for establishing a connection between a first USB device and a second USB device, wherein the connection between the first USB device and the second USB device does not include the USB host, receive a request to transfer data between the first USB device and the second USB device, and transmit, after receiving the request, data between the first USB device and the second USB device using the connection and without transferring at least a portion of the data to the USB host.

The details of one or more aspects of the disclosure are set forth in the accompanying drawings and the description below. Other features, objects, and advantages of the techniques described in this disclosure will be apparent from the description and drawings, and from the claims.

BRIEF DESCRIPTION OF DRAWINGS

FIG. 3 is a block diagram illustrating a USB host in communication with a USB device.

DETAILED DESCRIPTION

Figure 1:
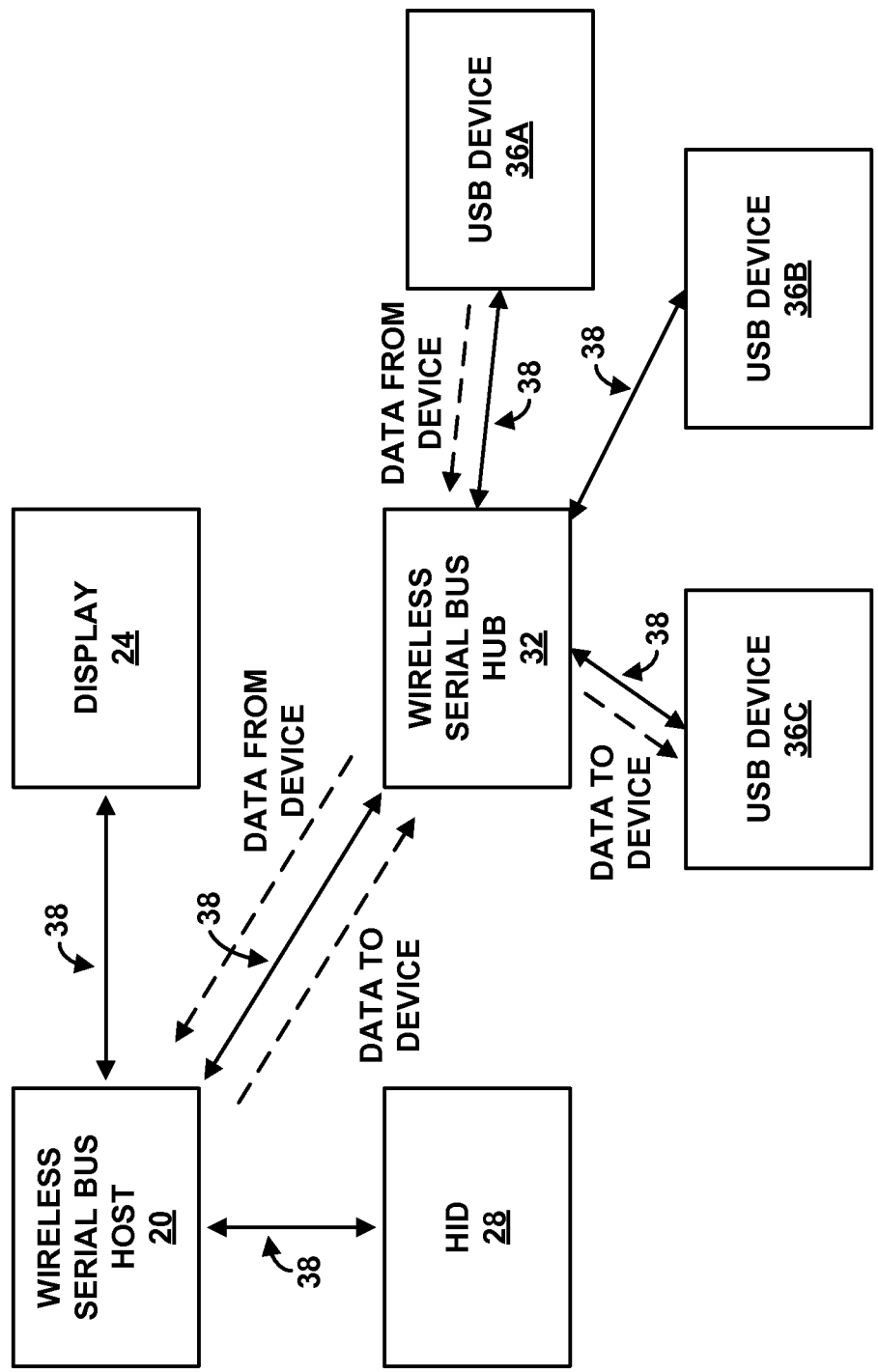
FIG. 1 is a block diagram illustrating an example system having a host, a hub, and devices, which may implement the techniques of this disclosure.

Computing devices (e.g., personal computers, laptop computers, tablet computers, mobile telephones such as so-called "smartphones," electronic handheld devices, e-readers, digital video cameras, digital cameras, hand-held gaming devices, gaming consoles, or other similar devices) may communicate with a variety of periphery devices using communication standard. One such communication standard includes a Universal Serial Bus (USB) connection. Some examples of peripheral devices that may use a USB connection include mice, keyboards, displays, digital cameras, printers, personal media players, mass storage devices such as flash drives, network adapters, and external hard drives. For many of those devices, USB has become a very common communication standard that facilitates peripheral device connection.

Accordingly, this disclosure may refer to a "USB device" as a peripheral device having a USB connection capable of communicating with a host computing device. In some examples, a USB device may communicate with the host device according to a common USB communication specification. That is, in an example, a USB device may communicate with the host device according to the USB 2.0 specification, as revised on Jul. 26, 2010, available publically at:

http://www.usb.org/developers/docs/usb_20_021411.zip.

In another example, a USB device and a host device may be configured to communicate according to another USB specification, such as USB 3.0, released Nov. 12, 28, available publically at:

http://www.usb.org/developers/docs/usb_30_spec_02411d.zip, Wireless USB, released Sep. 9, 2010, available publically at:

http://www.usb.org/developers/wusb/wusb1_1_20100910.zip, or other standards or proprietary communication specifications that are currently available or may emerge in the future.

This disclosure may refer to a device that supports the connection of more than one other device as a hub. For example, this disclosure may refer to a USB hub as a device supporting the connection of more than one USB device. That is, a USB hub may have a single "upstream" connection for connecting to a host device, and multiple "downstream" connections for connecting to multiple various USB devices. In some examples, a USB hub may be integrated into another device (e.g., a television that incorporates a USB hub) or peripheral device (e.g., a keyboard that incorporates a USB hub). Such USB devices may be referred to as compound USB devices.

In some examples, a host device may be in communication with a hub using a wireless communication channel, such as a short-range communication channel, similar to WiFi, Bluetooth, or the like. However, the communication channel is not necessarily limited in this respect, and may comprise any wireless or wired communication medium, such as a radio frequency (RF) spectrum or one or more physical transmission lines, or any combination of wireless and wired media. In other examples, the communication channel may even form part of a packet-based network, such as a local area network, a wide-area network, or a global network such as the Internet.

In some examples, the host device may be a mobile device, such as a tablet computer, smartphone, or other portable electronic device. Thus, the host mobile device may facilitate communication between a number of USB devices, including devices connected to a USB hub, as described in greater detail below.

Certain aspects of this disclosure relate to techniques for limiting the amount of data that is exchanged and/or the frequency with which data is exchanged between a host device (e.g., a host mobile device) and a USB hub having one or more connected USB devices. That is, aspects of this disclosure relate to techniques for streamlining communication between USB devices connected to a USB hub in a way that limits interaction with the host device. Accordingly, rather than the host device facilitating all communication of data between USB devices connected to a USB hub, the techniques of this disclosure allow data to be redirected in such a way that allows a more direct exchange of data between USB devices connected to a USB hub.

In an example for purposes of illustration, a host device may typically be responsible for detecting an attachment and removal of USB devices, managing data the flow of control information and data between the host device and USB devices, and collecting status activity and statistics associated with data transfer. To perform these functions, data must typically be routed through the host device. In an example for purposes of illustration, assume that the host device is connected to a USB hub connecting two or more other USB devices, and that a user wishes to transfer data between the USB device. In this example, control information and data is transferred from the sending USB device to the USB hub, to host, back to the USB hub, and to the receiving USB device.

With respect to the example above, aspects of this disclosure generally relate to rerouting information at the USB hub in order to reduce or eliminate the amount data that is routed through the host device during data transfer. Accordingly, the sending USB device may send data to the USB hub, which reroutes the data for direct transfer to the receiving USB device (and without exchanging the data with the host device). Limiting the amount of data that is exchanged and/or the frequency with of data is exchanged between the host device and the connected USB devices (via a USB hub) may minimize the delay associated with data transfer. That is, providing a more direct connection between the USB devices connected to the USB hub may eliminate the delay associated with transferring the data through the host device.

Moreover, limiting the amount of data and/or the frequency with which data is exchanged with the host device may help to reduce the amount of bandwidth that is consumed due to such an exchange of data. For example, by redirecting the data through the USB hub, data does not need to be transferred on the connection between the host device and the USB hub. Accordingly, the techniques reduce the amount of bandwidth consumed on the connection between the host device and the USB hub.

In addition, in examples in which the host device is a mobile device, limiting the amount of data and/or the frequency with which data is exchanged between the host device and the USB hub may help to minimize power consumption associated with data transfer. For example, limiting the amount of data transferred between the host device and hub also limits the number of components at the host device that would otherwise be necessary to carry out the data transfer (e.g., one or more processors, communication interfaces (e.g., a WiFi radio), and the like). In some instances, the host device may be a mobile device that is battery powered (or that is power limited in some other way). Accordingly, the techniques of this disclosure may help to maximize battery life of a power limited host device.

Thus, the techniques of this disclosure may be used to wirelessly connect peripheral devices to a host device with the equivalent quality to a wired connection, while also maintaining an acceptable power usage of the host device. That is, the techniques of this disclosure may provide support for efficient transfer of USB transfer types, e.g., interrupt, isochronous, bulk, and control, over a wireless link by defining an abstraction layer (e.g., a protocol abstraction layer, as described below) through which data transfer may be controlled. The techniques of this disclosure may be applicable to numerous devices, including but not limited to personal computers (PCs), consumer electronics, handheld devices, and a ubiquitous set of existing USB peripherals such as HID devices, storage devices, media devices, and printers.

While certain techniques of this disclosure are described with respect to the USB standards, it should be understood that the USB standards are only some examples of a communication standard that may be consistent with this disclosure. Thus, although the techniques are described in the context of USB standards, other similar communication standards (e.g., an IEEE 1394 standard, an Ethernet standard, a Serial Advanced Technology Attachment standard, a high-definition multimedia interface (HDMI) standard, and a Thunderbolt standard) or even future communication standards or techniques may likewise benefit from the teaching of this disclosure.

FIG. 1 is a block diagram illustrating an example system having a host, a hub, and devices, which may implement the techniques of this disclosure. For example, the system shown in FIG. 1 generally includes a wireless serial bus (WSB) host 20 that wirelessly communicates with a display 24, a human interface device (HID) 28 and a WSB hub 32 (which may be referred to as a USB hub in instances in which the WSB hub supports USB connections). The WSB hub 32 is also connected to three USB devices 36A, 36B, and 36C (collectively, USB devices 36). The components of FIG. 1 may communicate via communication channels 38.

In general, WSB host 20 includes an electronic device capable of hosting (e.g., communicating) with one or more other devices, such as WSB hub 32 and USB devices 36. In some examples, WSB host 20 may include a smartphone, tablet, or other mobile device. While primarily described with respect to mobile devices such as smartphones and tablets, WSB host 20 may include any electronic device capable of hosting one or more other devices, and may be integrated, for example, into appliances, automobiles, aircraft, watercraft or any other device capable of performing the data transfer capabilities consistent with the techniques described herein.

In some examples, WSB host 20 may be implemented as one or more microprocessors, digital signal processors (DSPs), application specific integrated circuits (ASICs), field programmable gate arrays (FPGAs), discrete logic, software, hardware, firmware or any combinations thereof. While not shown for purposes of clarity, WSB host 20 may include a memory comprised of any of a wide variety of volatile or non-volatile memory, including but not limited to random access memory (RAM) such as synchronous dynamic random access memory (SDRAM), read-only memory (ROM), non-volatile random access memory (NVRAM), electrically erasable programmable read-only memory (EEPROM), magnetic random access memory (MRAM), FLASH memory, and the like. The memory may comprise a computer-readable storage medium for storing audio data, video data, as well as other kinds of data. WSB host 20 may also include a transmitter/receiver unit that includes include various mixers, filters, amplifiers and other components designed for signal modulation, as well as one or more antennas and other components designed for transmitting and receiving data.

Display 24 may include any of a variety of video output devices such as a cathode ray tube (CRT), a liquid crystal display (LCD), a plasma display, a light emitting diode (LED) display, an organic light emitting diode (OLED) display, or another type of display device. In these or other examples, the display may be an emissive display or a transmissive display. In some instances, display 24 may include a WiFi enabled television or another device capable of receiving media data from one or more wireless connections.

HID 28 may include a variety of input devices. For example, HID 28 may include a device that allows a user to interact with WSB host 20. HID may generally include a mouse, keyboard, trackpad, camera, or the like. HID 28 may communicate with WSB host 20 via wired or wireless connections. For example, HID 28 may be WiFi or Bluetooth enabled for wireless communication with WSB host 20.

WSB hub 32 may support the connection of more than one other device, such as USB devices 36, and may enable communication between USB devices 36 and USB host 20. While WSB hub 32 is described in the context of USB standards, a USB hub is only one example of a communication hub consistent with this disclosure. While not specifically shown in FIG. 1, WSB hub 32 may include one or more processors and at least one memory (such as those described with respect to WSB host 20 above).

In the example shown in FIG. 1, WSB hub 32 has a single "upstream" connection for connecting WSB host 20 and multiple "downstream" connections for connecting to USB devices 36. WSB hub 32 may be integrated into another device, such as a computing device (e.g., a smartphone, tablet computer, laptop computer, desktop computer, WiFi enabled television, or the like) or a peripheral device (e.g., a USB keyboard device that includes an incorporated WSB hub).

Communication channels 38 generally represent any suitable communication medium, or collection of different communication media, for transmitting data between the devices shown in FIG. 1. Communication channels 38 may include relatively short-range communication channels, similar to WiFi, Bluetooth, or the like. However, communication channels 38 are not necessarily limited in this respect, and may comprise any wireless or wired communication medium, such as a radio frequency (RF) spectrum or one or more physical transmission lines, or any combination of wireless and wired media.

In other examples, communication channels 38 may even form part of a packet-based network, such as a local area network, a wide-area network, or a global network such as the Internet. The devices of FIG. 1 may communicate over communication channels 38 using a communications protocol such as a standard from the IEEE 1402.11 family of standards, or any other communication protocol or format. Any of the devices of FIG. 1 may communicate, for example, according to the Wi-Fi Direct or Wi-Fi Display (WFD) standards, such that the devices communicate directly with one another without the use of an intermediary such as wireless access points or so called hotspots. The devices may also establish a tunneled direct link setup (TDLS) to avoid or reduce network congestion. WFD and TDLS are intended to setup relatively short-distance communication sessions. Relatively short distance in this context may refer to, for example, less than approximately 70 meters, although in a noisy or obstructed environment the distance between devices may be even shorter, such as less than approximately 35 meters, or less than approximately 20 meters. Communication channels 38 may be infrastructure assisted, or may be peer-to-peer.

In some examples, one or more of the devices of FIG. 1 communicate via wired or wireless connections that conform to a USB standard or other wireless transmission standard, such as WiFi. For example, as noted above, the devices of FIG. 1 may communicate in conformity with the USB 2.0 specification, the USB 3.0 specification, the Wireless Universal Serial Bus Specification Revision 1.1 (released Sep. 9, 2010 and availably publically at http://www.usb.org/developers/wusb/docs/), or other standards or proprietary communication specifications that are currently available or may emerge in the future.

WSB host 20 may typically facilitate communication between USB devices 36 via WSB hub 32. For example, WSB host 20 may facilitate data transfer between USB device 36A and USB device 36B via WSB hub 32. For example, FIG. 1 generally illustrates data flow (represented by dashed arrows) between USB device 36A and USB device 36C, with WSB host 20 facilitating the data transfer. In this example, a user of WSB host 20 (which may be a mobile or other computing device) may initiate the data transfer from USB device 36A to USB device 36C using WSB host 20.

In a non-limiting example for purposes of illustration, and as described in greater detail below, USB device 36A may be a camera or another media device, while USB device 36C may be a storage device for storing the media generated by USB device 36A. In such an example, a user may initiate transfer of media data from USB device 36A to USB device 36C using WSB host 20.

As shown in FIG. 1, WSB host facilitates the data transfer between devices. That is, USB device 36A transmits data to WSB host 20 via WSB hub 32. WSB host 20 then routes the data to USB device 36C via WSB hub 32. Accordingly, in some examples, data must be transferred along communication channels 38 (which may include one or more wireless links) between WSB hub 32 and WSB host 20 twice for a single data transfer between USB devices 36A and 36C.

In the example described above, WSB host 20 only facilitates the data transfer and is not the intended recipient of the data. Accordingly, transferring data between WSB hub 32 and WSB host 20 may introduce delay, power consumption, and bandwidth consumption. Such factors may hinder performance and user experience.

Aspects of this disclosure generally relate to limiting or eliminating the amount of data that is exchanged and/or the frequency with which data is exchanged between WSB host 20 and WSB hub 32. That is, with respect to the example of FIG. 1, aspects of this disclosure relate to techniques for streamlining communication between USB device 36A and 36C through WSB hub 32 in a way that limits interaction with WSB host 20. In some examples, rather than WSB host 20 facilitating all communication of data between USB device 36A and USB device 36C, the techniques of this disclosure allow data to be redirected at WSB hub 32 to provide a more direct exchange of data between USB device 36A and USB device 36C, as described in greater detail with respect to FIG. 2 below.

Figure 2:
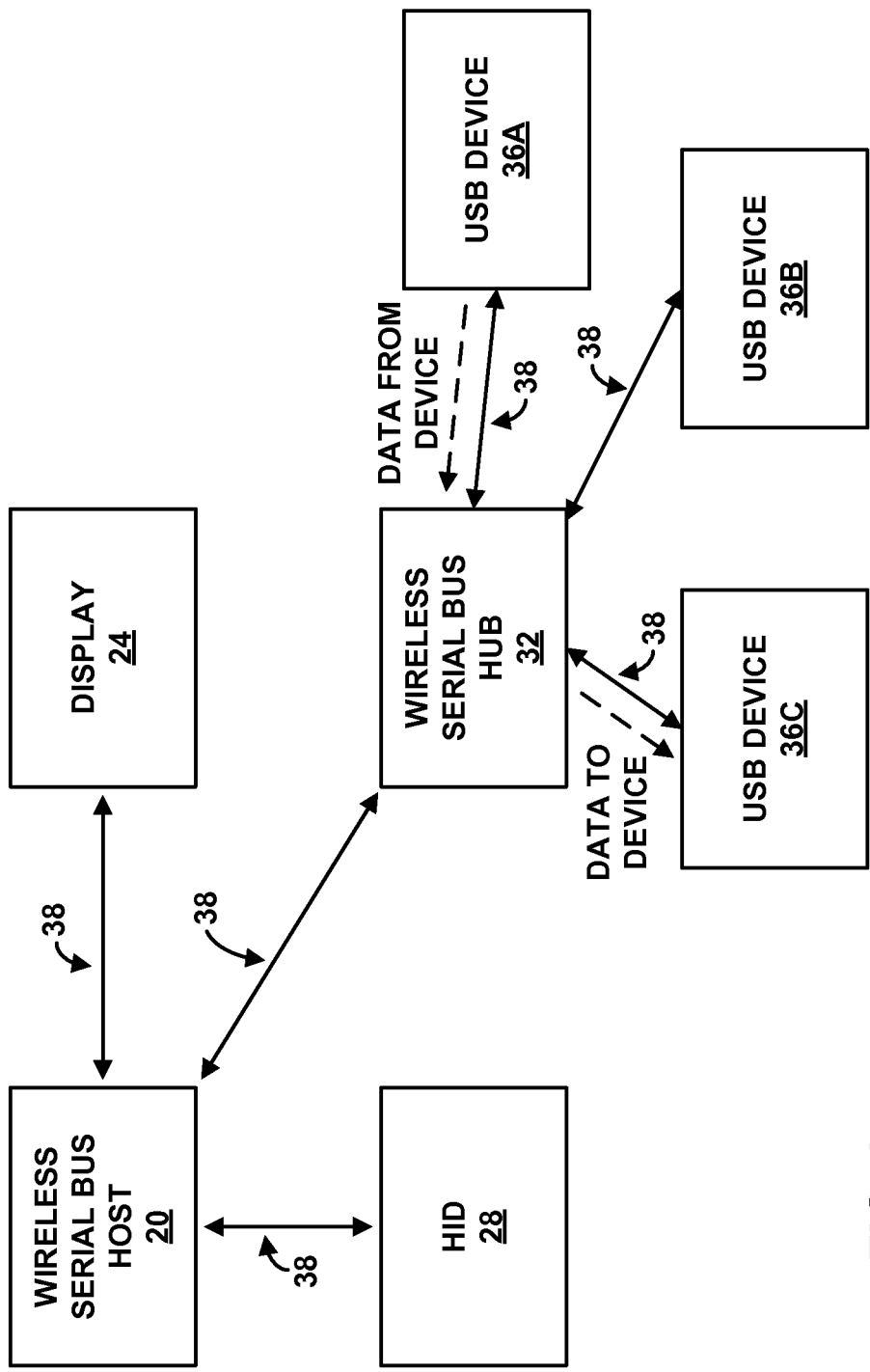
FIG. 2 is another block diagram illustrating the system of FIG. 1.

FIG. 2 is another block diagram illustrating the system of FIG. 1. According to aspects of this disclosure, rather than routing data through WSB host 20, data can be redirected at WSB hub 32. That is, in the example of FIG. 2, WSB host 20 may initiate data transfer between USB device 36A and USB device 36C. However, rather than routing data through WSB host 20, WSB host 20 may cause data to be redirected at WSB hub 32 such that data may be transferred directly between USB device 36A and USB device 36C via WSB hub 32.

Limiting the amount of data that is exchanged and/or the frequency with of data is exchanged between WSB host 20 and USB devices 36 (via WSB hub 32) may minimize the delay associated with data transfer. For example, avoiding transferring data between WSB host 20 and WSB hub 32 also avoids the delay associated with such data transfer. Moreover, limiting the amount of data and/or the frequency with which data is exchanged between WSB host 20 and USB devices 36 may help to reduce the amount of bandwidth that is consumed due to such an exchange of data. In addition, in examples in which WSB host 20 is a mobile device, limiting the amount of data and/or the frequency with which data is exchanged with USB devices 36 may help to maximize battery life of WSB host 20 (in examples in which the WSB host 20 is battery powered).

In some examples, the techniques of this disclosure may be achieved using a protocol abstraction layer, as described with respect to FIGS. 3-5 below.

FIG. 3 is a block diagram illustrating a USB host in communication with a USB device. That is, the example of FIG. 3 includes a host device (USB host) 40 having an associated USB host controller 42, USB system 44, and client 46 that is in communication with physical devices (USB device) 48A and 48B (collectively, physical devices 48) each having a USB bus interface 50, USB logical device 52, and function 54 (not shown in device 48B for simplicity) via hub 56.

Host 40 is generally responsible for detecting an attachment and removal of USB devices, managing data the flow of control information and data between the host device and USB devices, and collecting status activity and statistics associated with data transfer. Accordingly, host 40 typically acts as the coordinating entity for the USB. That is, host 40 typically controls access to the USB, and device 48 may only gain access to the bus by being granted access by host 40. Host 40 is also typically responsible for monitoring the topology of the USB.

Host controller 42 of host 40 may include an integrated root hub that provides attachment points to the USB wire. USB System 44 uses host controller 44 to manage data transfers between host 40 and device 48. The interface between USB system 44 and host controller 42 may be dependent on the hardware definition of host controller 42. USB system 44, in concert with host controller 42, may perform translation between the client's view of data transfers and the USB transactions appearing on the connection between host 40 and device 48. USB system 44 is also typically responsible for managing USB resources, such as bandwidth and bus power, so that client access to the USB is possible.

USB system 44 generally incorporates three basic components, which include a host controller driver (HCD), a USB driver, and host software. The HCD maps the various host controller implementations into USB system 44, so that host 40 can interact with device 48 without knowing to which host controller 42 the device is connected. The USB driver (USBD) provides the basic host interface (USBDI) for host 40 to device 48. The interface between the HCD and the USBD may be referred to as the host controller driver interface (HCDI). A particular HCDI is typically defined by each operating system that supports various host controller implementations. The USBD provides data transfer mechanisms in the form of I/O Request Packets (IRPs), which consist of a request to transport data across a specific pipe (e.g., communication channel 38). In addition to providing data transfer mechanisms, the USBD is responsible for presenting to host 40 an abstraction of device 48 that can be manipulated for configuration and state management.

Client 46 includes software entities that are responsible for directly interacting with USB device 48. When device 48 is attached to the system, this client 46 may interact directly with the peripheral hardware, i.e., device 48. The shared characteristics of the USB place USB system 44 between host 40 and device 48; that is, a client cannot typically directly access the device's hardware. Instead, client 46 may include a driver that creates requests and submits the requests to a USB driver stack for processing. Within each request, the client driver provides a variable-length data structure called a USB Request Block (URB). The URB structure describes the details of the request and also contains information about the status of the completed request. For example, for a device specific request, such as a configuration request, client 46 makes the request using a URB that is associated with an IRP. The process of associating an URB with an IRP, and sending the request to the USB driver stack is referred to as submitting a URB. To submit a URB, the client driver may use a specific device control code. The control code may provide an I/O interface that the client driver uses to manage its device and the port to which the device is connected.

Accordingly, the client driver of client 46 performs all device-specific operations, including data transfers, through URBs. The client driver initializes the URB with information about the request before submitting it to the USB driver stack. For certain types of requests, an operating system executed by client 46 may provide helper routines and macros that allocate and URB structure and fill the necessary members of the URB structure with details provided by the client driver.

With respect to USB device 48, in general, device 48 may provide additional functionality to host 40. The type of functionality provided by device 48 may vary widely, depending on the particular configuration and capability of device 48. However, all USB devices typically present the same basic interface to host 40. This allows host 40 to manage the USB-relevant aspects of different USB devices 48 in the same manner.

Device 48 communicates with host 40 via bus interface 50 of device 48. Device 48 typically must be configured before its function 54 may be used. Host 40 is generally responsible for configuring device 48. Host 40 typically requests configuration information from device 48 to determine the device's capabilities. Some of the information reported is common among all logical devices 52. Other information is specific to the function 54 provided by device 48. The detailed format of this information may vary, depending on the device class of the device.

In the example shown in FIG. 3, hub 56 is connected between host 40 and devices 48. Hub 56, in general, provides an interface between host 40 and devices 48. Hub 56 may typically support connectivity behavior, power management, device connect/disconnect detection, and bus fault detection and recovery. In some instances, hub 56 may include a hub repeater, a hub controller, and a transaction translator. The hub repeater may be responsible for connectivity setup and tear-down. The hub repeater may also support exception handling, such as bus fault detection and recovery and device connect/disconnect detection. The hub controller may provide the mechanism for host-to-hub communication. Hub-specific status and control commands permit host 40 to configure a hub and to monitor and control the individual downstream facing ports of the hub. The transaction translator responds to high-speed split transactions and translates them to full-/low-speed transactions with full-/low-speed devices attached on downstream facing ports.

Aspects of this disclosure generally relate to providing data transfer between devices 48 without routing data through host 40. However, the techniques do not include emulating the functions of host 40 at hub 56 to carry out such a data transfer. That is, client 46 and/or USB system 44 functions are not mirrored at hub 56 in order to control transactions with devices 48. Rather, according to some aspects, as described with greater detail below, a protocol stack may be implemented at host 40 and/or hub 56 that enables data to be redirected from one device 48 to another without routing such data through host 40.

Figure 4:
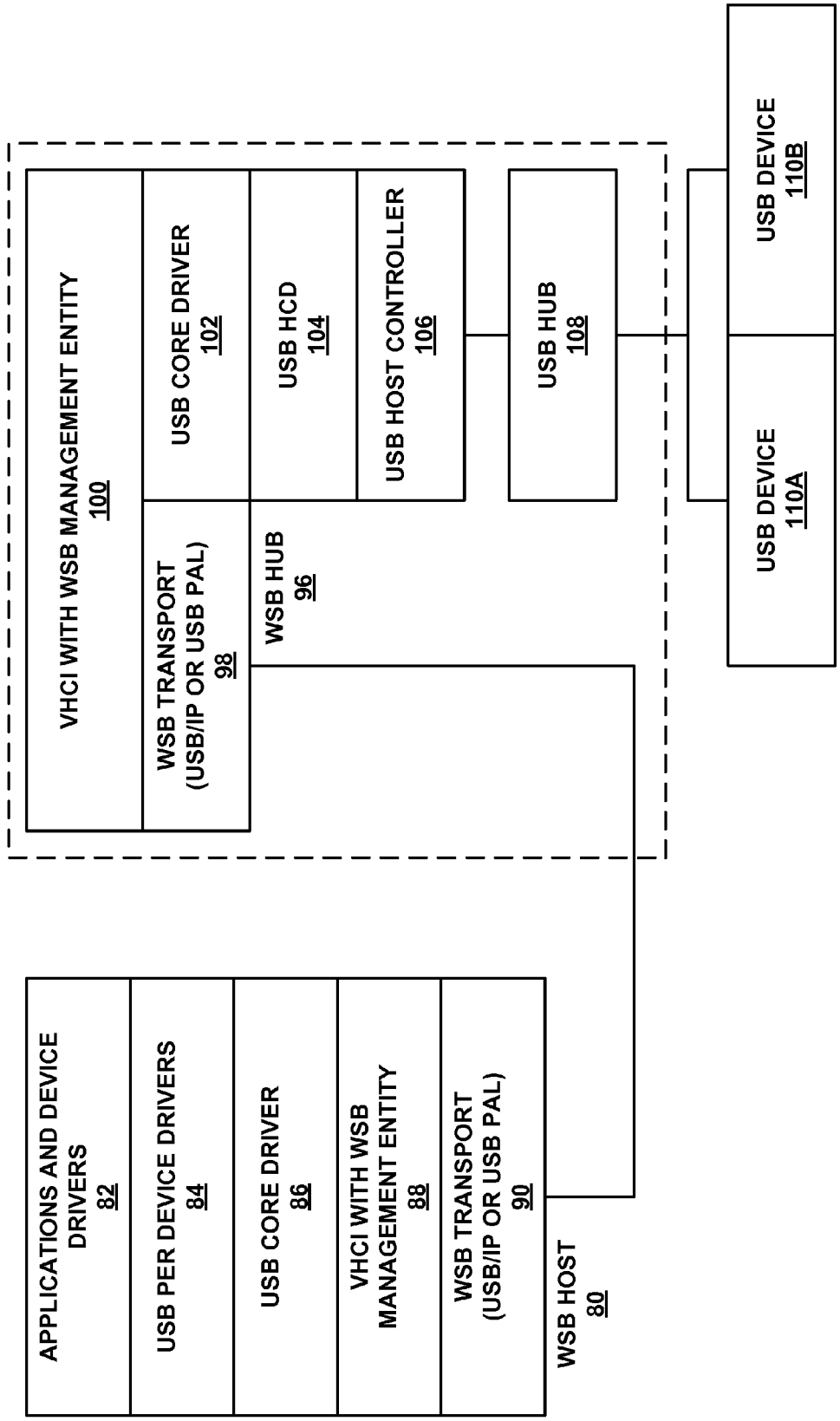
FIG. 4 is a block diagram of a wireless serial bus protocol stack.

FIG. 4 is a block diagram of a wireless serial bus (WSB) protocol stack, which may be maintained by a host and hub.

For example, FIG. 4 illustrates example protocol stacks for a WSB host 80 (e.g., a computing device, such as a mobile computing device implementing a WSB connection) and a WSB hub 96 (e.g., a hub implementing one or more WSB connections). In some examples, the WSB host and WSB hub may communicate via a WiFi connection. In such examples, messages may be encapsulated into transport control protocol (TCP)/internet protocol (IP) payloads and exchanged between the devices.

In the example shown in FIG. 4, the stack for WSB host 80 includes applications and device drivers 82, USB per device drivers 84, a USB core driver 86, a Virtual Host Controller Interface (VHCI) driver 88, and a WSB transport layer 90. The stack for the WSB hub 96 includes a transport layer 98, a VHCI driver 100, a USB core driver 102, a USB host controller driver 104, a USB host controller 106. FIG. 4 also illustrates a USB hub 108 connected to USB devices 110A and 110B (collectively USB device 110).

With respect to WSB host 80, applications and device drivers 82 typically reside at WSB host 80 and may be executed by an operating system at host. USB per device drivers 84 may bind drivers to particular devices, each of the devices having a unique ID. USB core driver 86 may include one or more drivers forming the core of the USB, and may be involved in managing the USB bus.

VHCI 88 may be implemented as a USB host controller driver (as shown, for example, in FIG. 3). VHCI 88 may emulate a real USB host controller interface for virtual attachment/detachment, enumeration and initialization of remote USB devices. VHCI 88 may encapsulate USB request blocks (URB messages) and then transmit requests to remote server hosts, such as WSB hub 96. Transport layer 90 may be responsible for encapsulating messages from WSB host 80 for transport. For example, transport layer 90 may encapsulate USB I/O messages into TCP/IP payloads prior to transmission to WSB hub 98.

With respect to WSB hub 96, transport 98 may decapsulate messages received from WSB host 80. In addition, VHCI 98 may decapsulate URB messages into USB requests and submit the requests to the drivers of WUB hub 98. USB core driver 102 may include one or more drivers forming the core of the USB at WSB hub 96, and may be involved in managing the USB bus. As described above with respect to FIG. 3, USB HCD 104 may map various host controller implementations to allow WSB host 80 to interact with WSB hub 96 without knowing the configuration of the host controller at WSB host 80. USB host controller 106 may be responsible for controlling transport of data to USB hub 108, which then provides the data to USB devices 110.

Data may be transferred from USB device 110A to USB device 110B using the system shown in FIG. 4. For example, applications and device drivers 82 may initiate a data transfer. USB device 110A may transfer data to USB hub 108, which then passes the data through the stack at WSB hub 96. The data is then transferred from WSB hub 96 to WSB host 80, and passes through the stack at WSB host 80. The data is then passed back from the WSB host 80, through WSB hub 96 and USB hub 108 to USB device 110B. In this way, data traverses the entire bus from USB device 110A to USB device 110B. As described below, aspects of this disclosure generally relate to shortening the data path between USB device 110A and 110B to provide more efficient data transfer. That is, according to aspects of this disclosure, data may be redirected at WSB hub 96, which reduces or eliminates the amount of data that is exchanged with WSB host 80.

Figure 5:
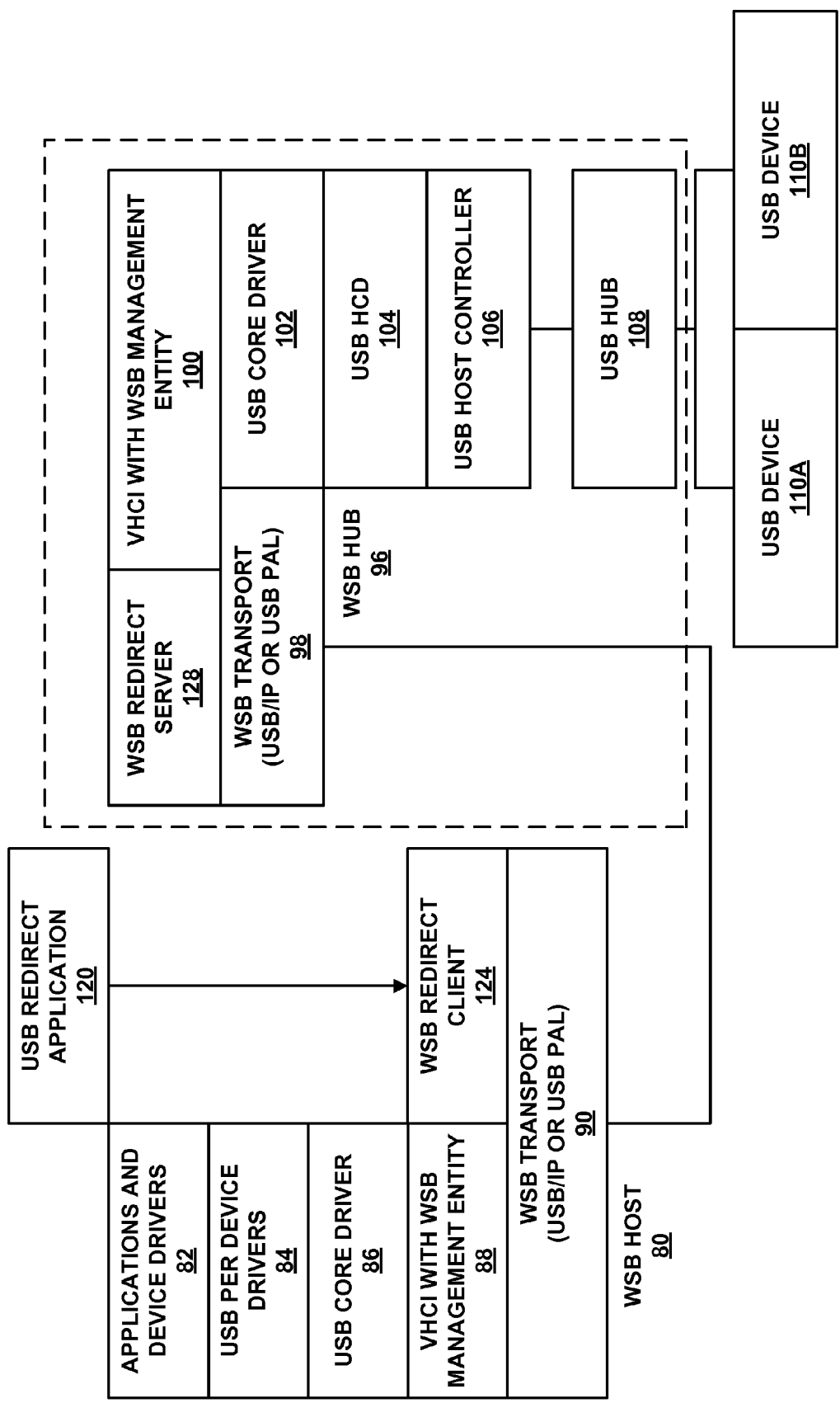
FIG. 5 is a block diagram of another wireless serial bus protocol stack that may implement the techniques of this disclosure.

FIG. 5 is another block diagram of a wireless serial bus protocol stack that may be used to implement certain techniques of this disclosure. In addition to the components shown in FIG. 4, the example of FIG. 5 also includes a USB redirect application 120, a WSB redirect client 124, and a WSB redirect server 128. According to some aspects of this disclosure, USB redirect application 124, WSB redirect client 124, and WSB redirect server 128 may be used to redirect data between USB devices 110 without routing the data through WSB host 80.

For example, USB redirect application 120 residing at WSB host 80 may be responsible for initiating and maintaining a data redirect at WSB hub 96. USB redirect application may, in some instances, maintain a list of devices (or classes of devices) suitable for data redirect. In other instances, USB redirect application 120 may be user configurable to redirect communication between user selected devices. In any case, devices suitable for redirect may include a wide variety of USB devices. Examples include media devices, storage devices, and/or displays. USB redirect application 120 may automatically initiate redirect upon more than one qualified USB device being connected to WSB hub 96 (after being enumerated by WSB host 80).

WSB redirect client 124 and WSB redirect server 128 may maintain the redirect connection. For example, WSB redirect client 124 and WSB redirect sever 128 may be responsible for making it appear to applications and device drivers 82 as if a normal data transfer is occurring (involving WSB host 80, as described above with respect to FIG. 4) when in fact data is being redirected at WSB hub 96. In some examples, WSB redirect client 124 and WSB redirect server 128 may accomplish this task using a series of URB messages between WSB redirect client 124 and WSB redirect server 128. For example, as described in greater detail with respect to FIGS. 8 and 9 below, WSB redirect client 124 may make URB requests for data to be transferred. WSB redirect server 128 send acknowledgements after data has been transferred, thereby maintaining the correct operational state with applications and device drivers 82.

In this way, WSB redirect client 124 and WSB redirect server 128 may redirect data being transferred between USB device 110A and USB device 110B without drivers and functions of WSB host 80 being mirrored or otherwise performed by WSB hub 96. In an example for purposes of illustration, the techniques may be used in a WiFi display (WFD) application. For example, WFD may be built on peer to peer (P2P) (e.g., rather than independent basic service set (IBSS) wireless local area network (WLAN)) to provide a one-hop wireless link for real-time video data transfer. Video traffic over a multi-hop wireless system may limit performance required for real-time applications. According to aspects of this disclosure, USB device 110A may comprise a display device that receives media data from USB device 110B using WFD and the redirect techniques described above. In some instances, performance for isochronous mode USB data transfer for WSB may match that of wired USB.

While FIGS. 4 and 5 are generally described herein as being carried out over a WiFi connection, it should be understood that the techniques may also be used with other wireless communication technologies. For example, the techniques of this disclosure may be implemented, in an example, in systems implementing the Wireless USB (WUSB) communication standard.

Figure 6:
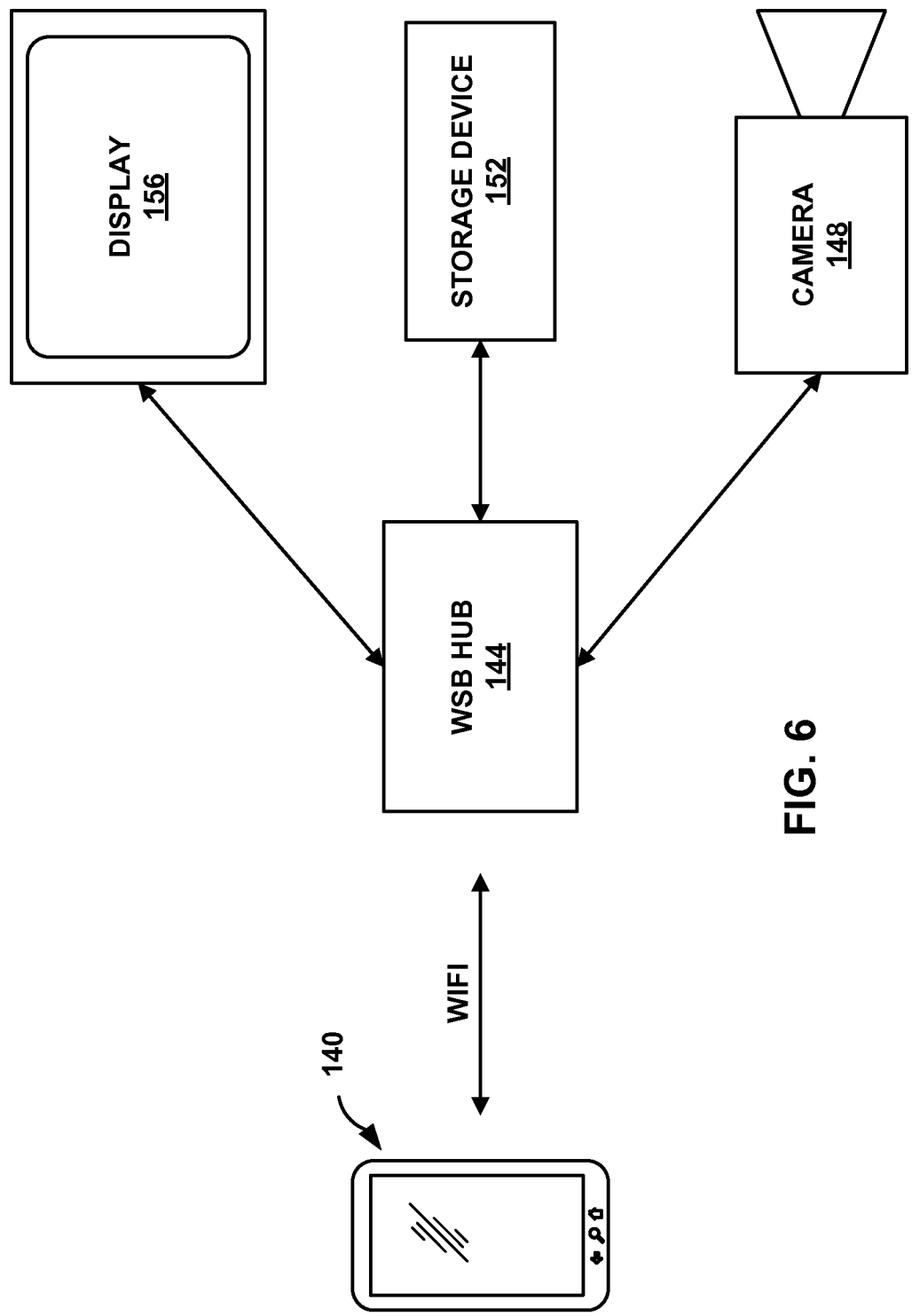
FIG. 6 is a conceptual block diagram illustrating a system for wireless communication including a hub, which may implement the techniques of this disclosure.

FIG. 6 is a conceptual diagram illustrating a system for wireless communication including a hub, which may implement the techniques of this disclosure. The example of FIG. 6 includes a host (shown in FIG. 6 as a mobile device) 140, a WSB hub 144, a camera 148, a storage device 152, and a display 156. It should be understood that the components shown in FIG. 6 are provided for purposes of example only, and the techniques of this disclosure may be performed with components other than those shown in FIG. 6.

Mobile device 140 may comprise a variety of electronic devices including, for example, a tablet computer or smartphone. In the example shown in FIG. 6, mobile device 140 may act as a WSB host, and may perform the operations described with respect to a WSB host elsewhere in this disclosure. For example, mobile device 140 may wirelessly host one or more other devices connected via a bus, such as one or more USB devices connected via a serial bus. In the example shown in FIG. 6, mobile device 140 communicates with WSB hub 144 via a wireless connection (e.g., shown in FIG. 4C as a WiFi connection, although other wireless standards may be used).

In addition to the connection to mobile device 140, WSB hub 144 supports a connection to camera 148, storage device 152, and display 156. For example, WSB hub allows mobile device 140 to communicate with each of camera 148, storage device 152, and display 156. In some examples, WSB hub 144 may support connections according to one or more standards, such as a USB standard. In addition, according to the aspects of this disclosure, WSB hub 144 may also support direct transfer of data between camera 148, storage device 152, and display 156.

Camera 148 may capture still images or video. In some examples, camera 148 may be incorporated in another device, such as a computing device (e.g., a mobile device, tablet computer, or the like). Storage device 152 may comprise a computer-readable, machine-readable, or processor-readable storage medium. In some examples, storage device 152 may store media data, such as still images or video captured by camera 148. Display 156 represents a component capable of displaying video data, images, text or any other type of data for consumption by a viewer. Examples of display 156 include a liquid-crystal display (LCD), a light emitting diode (LED) display, an organic LED (OLED), an active-matrix OLED (AMOLED) display, or the like.

In an example use scenario, a user may access camera 148, storage device 152, and display 156 using mobile device 140 via WSB hub 144. That is, for example, a user may use mobile device 140 to cause image data from camera 148 to be previewed on display 156. In addition, after previewing the image data from camera 148, the user may use mobile device 140 to cause image data from camera 148 to be stored on storage device 152. In this scenario, mobile device 140 hosts camera 148, storage device 152, and display 156, and initiates transfer of data between the devices.

According to aspects of this disclosure, mobile device 140 may cause data to be transferred between camera 148, storage device 152, and/or display 156 without being routed through mobile device 140. For example, as noted above, rather than routing data through mobile device 140, data can be redirected at WSB hub 144 thereby directly transferring the data between camera 148 and storage device 152 or display 156.

In some examples, some data may still be routed between mobile device 140 and camera 148, storage device 152, and/or display 156. For example, certain data that identifies the attached devices or other metadata may continue to be routed to mobile device 140. As described in greater detail below, mobile device 140 may use such data to maintain connections with the attached devices. However, according to the aspects of this disclosure, other data (e.g., payload data) may be transferred directly between the attached devices.

In this way, power consumption by mobile device 140 may be reduced. In addition, data transfer between attached devices may be less susceptible to wireless channel fluctuations (such as fluctuations in the connection between mobile device 140 and WSB hub 144), because less data is communicated via the wireless channel.

Figure 7:
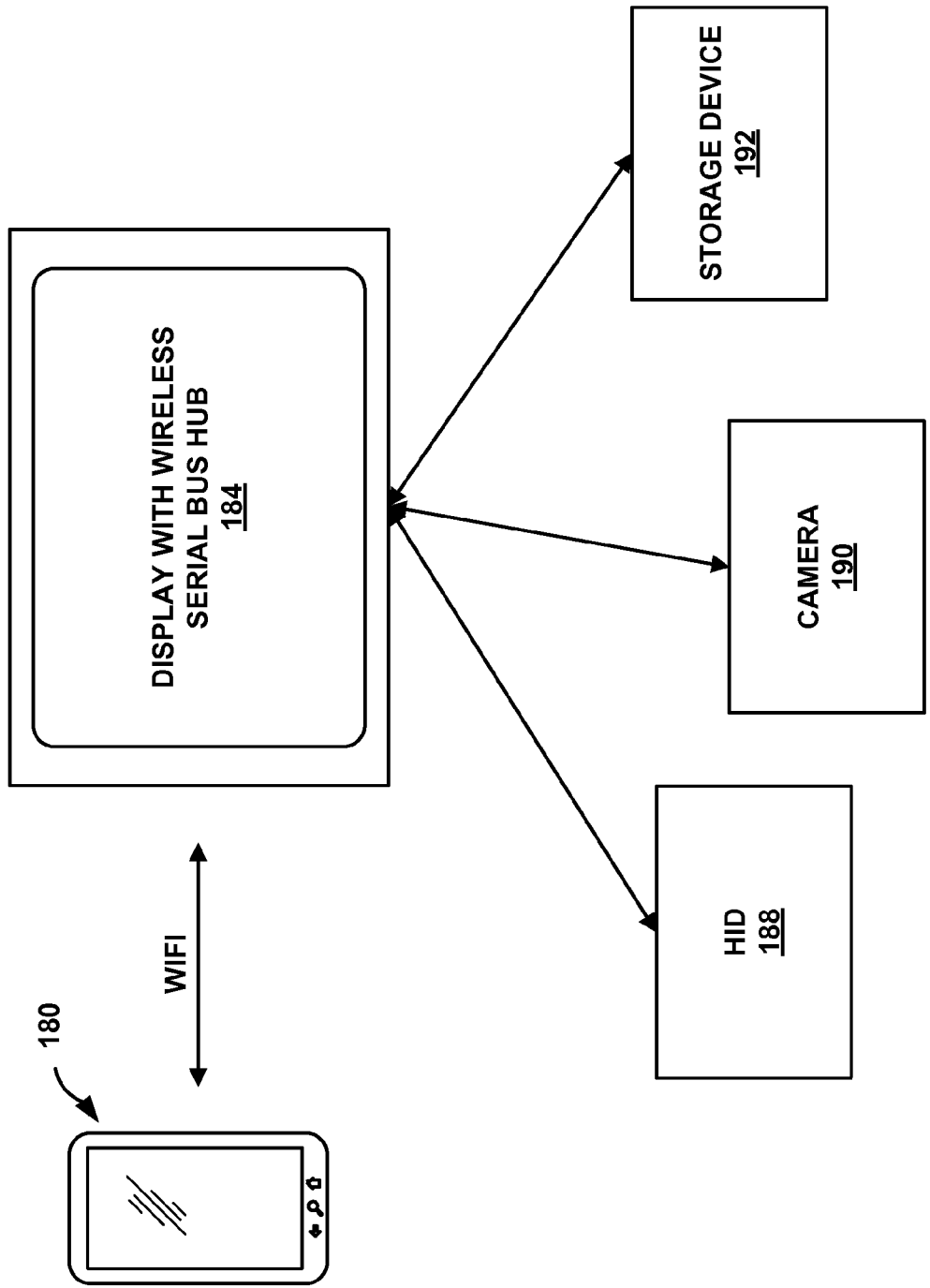
FIG. 7 is a conceptual block diagram illustrating another system for wireless communication including a hub, which may implement the techniques of this disclosure.

FIG. 7 is a conceptual diagram illustrating another system for wireless communication including a hub, which may implement the techniques of this disclosure. For example, the system shown in FIG. 7 generally includes a wireless serial bus (WSB) host 180 (shown in FIG. 7 as a smartphone) that wirelessly communicates with a display 184. Display 184 includes a WSB hub that provides USB connections with human interface device (HID) 188, camera 190, and storage device 192. The connections between display 184 and devices 188-192 may be wired or wireless connections. It should be understood that the devices of FIG. 7 are provided for purposes of example only, and other components may be used to carry out the techniques of this disclosure.

In this example, a user may access camera 190 and storage device 192 using host 180 via display 184. That is, for example, a user may use host 180 to cause image data from camera 190 to be previewed on display 184. In addition, after previewing the image data from camera 190, the user may use host 180 to cause image data from camera 190 to be stored on storage device 192. In this scenario, host 180 hosts camera 190, storage device 192, and display 184, and initiates transfer of data between the devices. In some examples, host 180 may communicate with display 184 via a WiFi (e.g., WiFi display) or another wireless medium.

As noted above with respect to FIG. 6, according to aspects of this disclosure, host 180 may cause data to be transferred between camera 190, storage device 192, and/or display 184 without being routed through host 180. For example, rather than routing data through host 180, data can be redirected at display 184 (including a WSB hub), thereby directly transferring the data between camera 190 and storage device 192. In this way, latencies associated with data transfer between devices may be reduced. In addition, power consumption by host 180 may also be reduced. Moreover, data transfer between devices may be less susceptible to wireless channel fluctuations.

Figure 8:
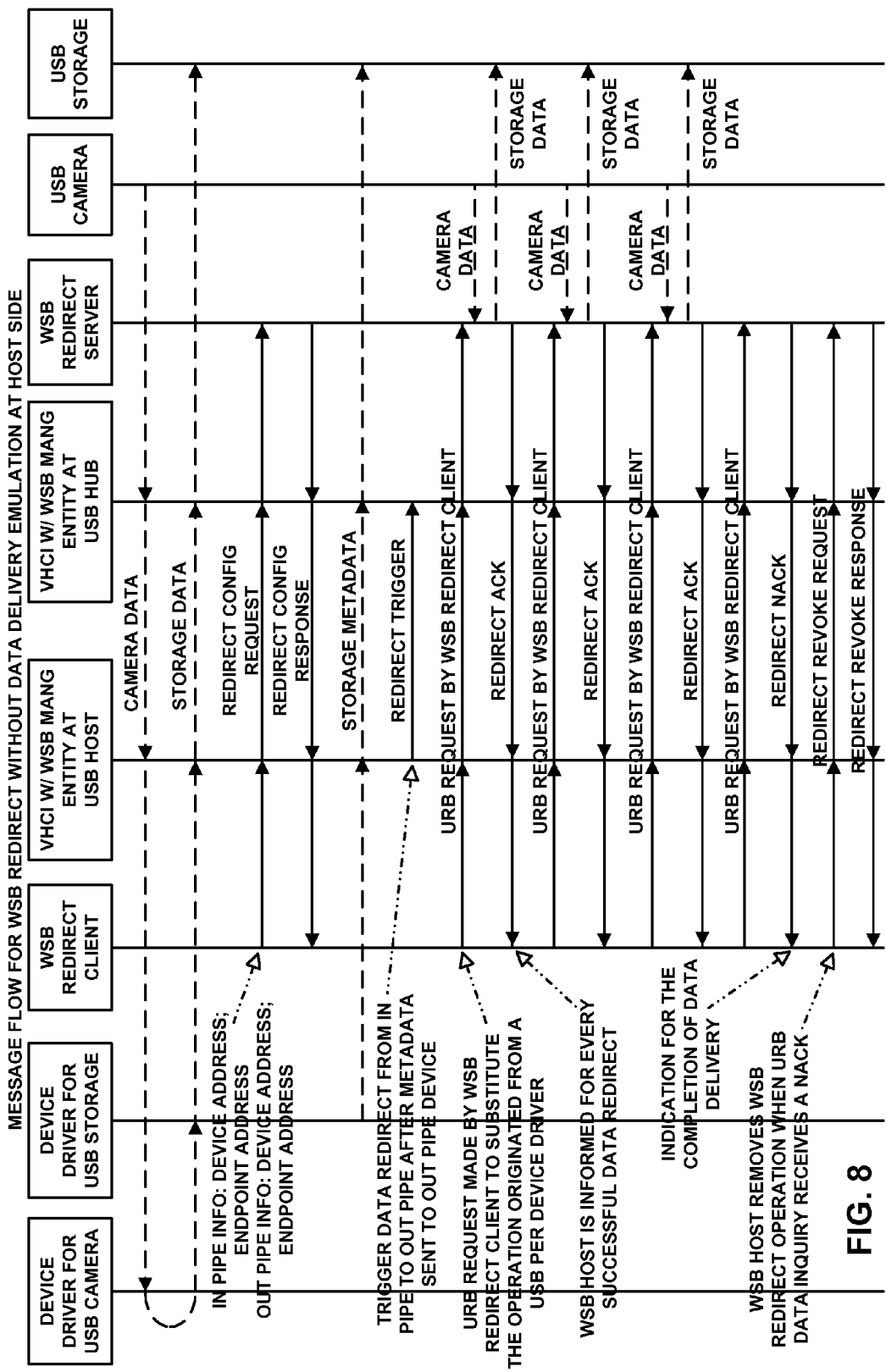
FIG. 8 is a conceptual message communication diagram illustrating an example flow of messages in a wireless system implementing the techniques of this disclosure.

FIG. 8 is a conceptual message communication diagram illustrating an example flow of messages in a wireless system implementing the techniques of this disclosure. For example, FIG. 8 illustrates an example flow of messages that may be transmitted between components using the USB redirect application, the WSB redirect client, and the WSB redirect server shown in FIG. 5. While the example in FIG. 8 refers to "USB camera" and "USB storage," it should be understood that the techniques of this disclosure are not limited in this way. For example, other USB devices connected to a WSB hub may implement the techniques of this disclosure to exchange data.

In some examples, data being redirected may be delay sensitive data. For example, media data being transmitted between a camera and/or storage device and a display device may be delay sensitive in the sense that the data must be delivered within a certain period of time, or certain defects (e.g., stutter, blockiness, and the like) may appear in the displayed data.

In any event, according to aspects of this disclosure, data redirection may be performed using a host (such as WSB host 80 shown in FIG. 5) and a hub (such as WSB hub 96) at a URB transaction layer, i.e., the layer responsible for handling URB messages. In general, as noted above, a URB may consist of relevant information to execute a USB transaction and deliver the data and/or status block. Each URB may have a completion handler, which may be called after the action has been successfully completed or canceled. The URB may also contain a context pointer for passing information to the completion handler. Each endpoint for a device may logically support a queue of requests. The queue may be filled, so that USB hardware can still transfer data to an endpoint while the driver handles completion of another. This may maximize use of USB bandwidth.

According to aspects of this disclosure, an application residing on the WSB host device may initiate the message redirect (such as application 120 shown in FIG. 5). For example, the application may maintain a list of devices (or classes of devices) suitable for data redirect. In some examples, as described above, such devices may include media devices, storage devices, and/or displays. The application may automatically initiate redirect upon more than one qualified USB device being connected to the WSB hub.

The example of FIG. 8 generally illustrates data being transferred between a USB camera and a USB storage device. The description of FIG. 8 below will proceed in chronological order from the top of FIG. 8 to the bottom of FIG. 8. The dashed line at the top of FIG. 8 illustrates a typical data flow between USB camera and USB storage device that includes data being transferred through the host device drivers. Each arrowhead shown in FIG. 8 represents a stop on the serial bus. That is, the component located at each arrowhead interacts with the message (e.g., encapsulates the message, decapsulates the message, reads/interprets the message, and the like), as described below.

According to aspects of this disclosure, upon the camera and storage device being connected to the hub, a WSB redirect client (at the WSB host) may send a redirect configuration request to the WSB server (at the WSB hub) to establish a redirect connection ("redirect config request"). The WSB server may respond to the configuration request in kind ("redirect config response"). In general, the reconfiguration request and response may set up a connection between the USB camera and USB storage device (through the USB hub) that does not include the host device. For example, the configuration request and/or response may include data identifying the devices connected to WSB hub, the ports of the WSB hub to which the devices are connected, and the like. Accordingly, the reconfiguration request and response can be used to identify the ports between which data will be transferred using the redirect connection. That is, in some examples, the redirect configuration request and response establish the USB addresses between which data will be routed.

After setting up the redirect connection, the device driver for the USB storage device may send data (e.g., metadata) that describes characteristics of the data for transfer. The data may include, for example, an amount of data, a file name for the data, a directory in which to save the data, a sector on a hard drive of the USB storage device on which to save the data, an address at which to save the data, and the like.

After establishing a redirect connection and exchanging the metadata, the WSB host may commence the redirect session. For example, the WSB host may send a trigger to the WSB hub, which indicates that the WSB hub should redirect certain data (e.g., media data, or other predefined data) according to the configured redirect connection ("redirect trigger"). In some examples, the WSB host may automatically send the trigger after the data described above is exchanged.

In any case, after receiving the trigger, the WSB host may send a URB request to the WSB server to initiate data transfer between the devices connected to the WSB hub ("URB request by WSB redirect client"). That is, rather than a request of data transfer being issued by a device driver at the WSB host (such as device drivers for the camera or the storage), the WSB server may make such a request. However, according to aspects of this disclosure, no changes are required for device drivers at the WSB host. That is, the WSB host may maintain communication with the device drivers as if data was being routed through the WSB host. The URB request may indicate an amount (or "size") of data to be transferred between the USB camera and the USB storage. That is, the URB request may indicate how much data should be transferred between that USB camera and the USB storage.

After receiving the URB request, the WSB redirect server may carry out data transfer between the camera and the storage. That is, the USB camera may send data to the WSB redirect server ("camera data"). The WSB redirect server may then redirect the data to the storage ("storage data") without allowing the data to be routed through the host device.

According to aspects of this disclosure, after a predetermined data transfer has occurred, the WSB server may send an acknowledgement or other message to the WSB client ("redirect ack"). The acknowledgement may indicate how much data was transferred. The WSB server may use the acknowledgement to maintain the appropriate status with the device drivers at the WSB host. In this way, the WSB host is informed for every successful data redirect.

The WSB redirect client and the WSB redirect sever may continue to communicate in this way until all of the requested data has been transferred. For example, the WSB redirect client may send a request ("URB request by WSB redirect client"), followed by data being exchanged between the devices ("camera data" and "storage data"), followed by an acknowledgment ("redirect ack"). This process is shown in the example of FIG. 8 as being completed three times, although other examples may have more or fewer than those shown in FIG. 8.

In some examples, the WSB redirect client may continue sending URB request, provided the WSB redirect client receives an acknowledgement in return. After all of the data has been transferred (as determined by the WSB redirect server based on received indications from the devices or a timeout), the WSB redirect sever may send a message to the WSB redirect client to end the redirect session. For example, rather than sending an acknowledgement, the WSB redirect server may send a negative acknowledgement or other message to the WSB redirect client ("redirect nack").

Upon receiving the negative acknowledgement (or some other event, such as a timeout due to a delay in data transfer), WSB redirect client may send a request to terminate the directed session ("redirect revoke request"). Upon receiving the request to terminate the redirect connection, the WSB redirect server may responds with a confirmation ("redirect revoke response").

As noted above, while the example in FIG. 8 refers to "USB camera" and "USB storage," it should be understood that the techniques of this disclosure are not limited in this way. For example, other USB devices connected to a WSB hub may implement the techniques of this disclosure to exchange data. Moreover, the sequence of messages shown in FIG. 8 is an example, and the techniques need not necessarily be performed in the order shown in FIG. 8, and fewer, additional, or alternative steps may be performed.

Figure 9:
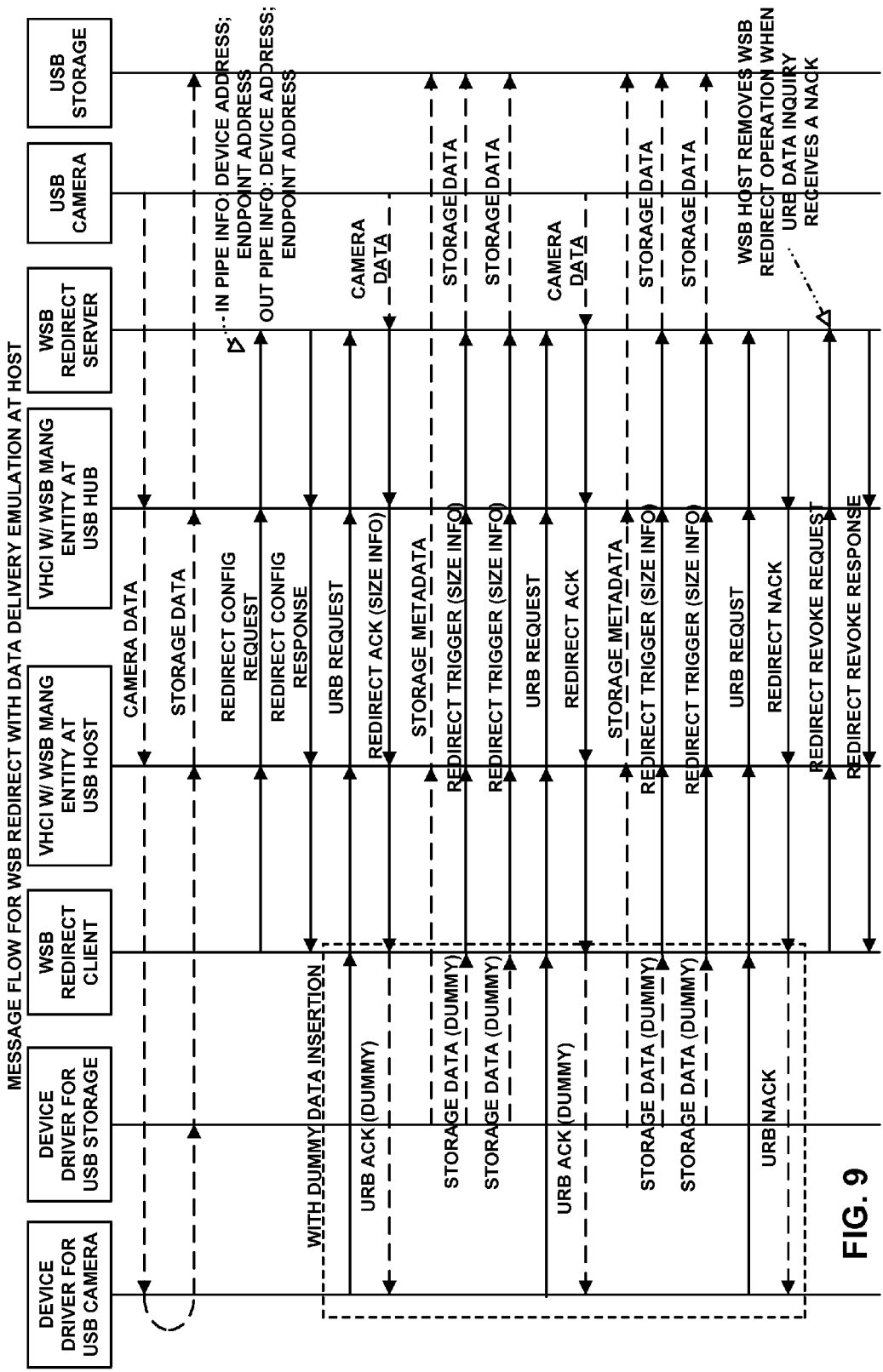
FIG. 9 is a conceptual message communication diagram illustrating another example flow of messages in a wireless system implementing the techniques of this disclosure.

FIG. 9 is a conceptual message communication diagram illustrating another example flow of messages in a wireless system implementing the techniques of this disclosure. FIG. 9 illustrates the same arrangement of components as FIG. 8. However, in the example of FIG. 9, "dummy data" is used at the WSB redirect client for transfer between the USB device drivers. That is, rather than transmitting the data itself, the dummy data may be used to maintain the appropriate status with the device drivers at the WSB host, and may be discarded without being sent to the WSB server.

As with FIG. 8, each arrowhead shown in FIG. 9 represents a stop on the serial bus. That is, the component located at each arrowhead interacts with the message (e.g., encapsulates the message, decapsulates the message, reads/interprets the message, and the like), as described below.

In the example of FIG. 9, according to aspects of this disclosure, upon the camera and storage device being connected to the hub, a WSB redirect client (at the WSB host) may send a redirect configuration request to the WSB server (at the WSB hub) to establish a redirect connection ("redirect config request"). The WSB server may respond to the configuration request in kind ("redirect config response"). In general, the reconfiguration request and response may set up a connection between the USB camera and USB storage device (through the USB hub) that does not include the host device. For example, the configuration request and/or response may include data identifying the devices connected to WSB hub, the ports of the WSB hub to which the devices are connected, and the like. Accordingly, the reconfiguration request and response can be used to identify the ports between which data will be transferred using the redirect connection. That is, in some examples, the redirect configuration request and response establish the USB addresses between which data will be routed.

The device driver for the camera may then send a URB request to the WSB redirect server ("URB request"), requesting a data transfer from the camera. The WSB redirect server receives the data from the camera ("camera data") and sends an acknowledgement message to the WSB redirect client ("redirect ack (size info)"). The acknowledgement message may, in some instances, include information about the data received by the WSB redirect server (from the camera). That is, the WSB redirect server may provide information regarding the amount of camera data sent from the camera to be redirected.

The WSB redirect client may pass this information to the driver for the USB camera to maintain the appropriate operational status of the driver ("URB ack (dummy)"). That is, the WSB redirect server may inform the WSB redirect client how much data is being transferred. In some examples, the WSB redirect client may then generate data (dummy data) of the appropriate size to pass to the device driver for the USB camera ("URB ack (dummy)"). In some examples, this dummy data may be provided in the form of a URB message. The dummy data may indicate any string of bits, as long as the dummy data is the appropriate size.

The driver for the USB storage may then pass data regarding characteristics of the data to be transferred to USB storage ("storage metadata"). The data may include, for example, a file name for the data, a directory in which to save the data, a sector on a hard drive of the USB storage device on which to save the data, an address at which to save the data, and the like.

After the storage metadata has been transferred, the driver for the USB storage may initiate the data transfer. For example, the driver for the USB storage may submit the previously generated dummy data to the WSB redirect client, as if the USB storage device driver was transferring the actual camera data to the USB storage ("storage data (dummy)"). As noted above, the dummy data provides an indication of the size of the data being transferred. Because the dummy data is not transferred between the host and the hub, the WSB redirect client may discard the dummy data.

Instead, the WSB redirect client sends a redirect trigger to the WSB redirect server ("redirect trigger (size info)"), thereby initiating data transfer from WSB redirect server to the USB storage. Upon receiving the indication regarding how much data to transfer, WSB redirect server carries out the data transfer ("storage data").

This process may be repeated until all of the data associated with the URB request has been transferred to the USB storage. That is, the device driver for the USB storage may initiate the data transfer with a message to the WSB redirect client ("storage data (dummy)"), which sends a trigger to the WSB redirect server ("redirect trigger (size info)"), which completes transfer of the data ("storage data"). In the example shown in FIG. 9, two data transfers are associated with a URB request message. In other examples, more or fewer data transfers may be associated with the URB request message.

In some examples, the device driver for the USB camera at the host may continue sending URB request, provided the device driver for the USB camera receives an acknowledgement in return. After all of the data has been transferred (as determined by the WSB redirect server based on received indications from the devices or a timeout), the WSB redirect sever may send a message to the WSB redirect client to end the redirect session. For example, rather than sending an acknowledgement, the WSB redirect server may send a negative acknowledgement or other message to the WSB redirect client ("redirect nack"). The WSB redirect client may pass this message on to the device driver for the USB camera in the form of a URB message ("URB nack").

Upon receiving the negative acknowledgement (or some other event, such as a timeout due to a delay in data transfer), WSB redirect client may send a request to terminate the directed session ("redirect revoke request"). Upon receiving the request to terminate the redirect connection, the WSB redirect server may responds with a confirmation ("redirect revoke response").

Accordingly, the techniques described with respect to FIGS. 8 and 9 provide a data reduction protocol between the USB sessions at the URB transaction layer that do not require changes to the USB device drivers. That is, the WSB redirect client and server may redirect messages while also maintaining the appropriate operational states of the various device drivers.

As noted above, while the example in FIG. 9 refers to "USB camera" and "USB storage," it should be understood that the techniques of this disclosure are not limited in this way. For example, other USB devices connected to a WSB hub may implement the techniques of this disclosure to exchange data. Moreover, the sequence of messages shown in FIG. 9 is an example, and the techniques need not necessarily be performed in the order shown in FIG. 9, and fewer, additional, or alternative steps may be performed.

Figure 10:
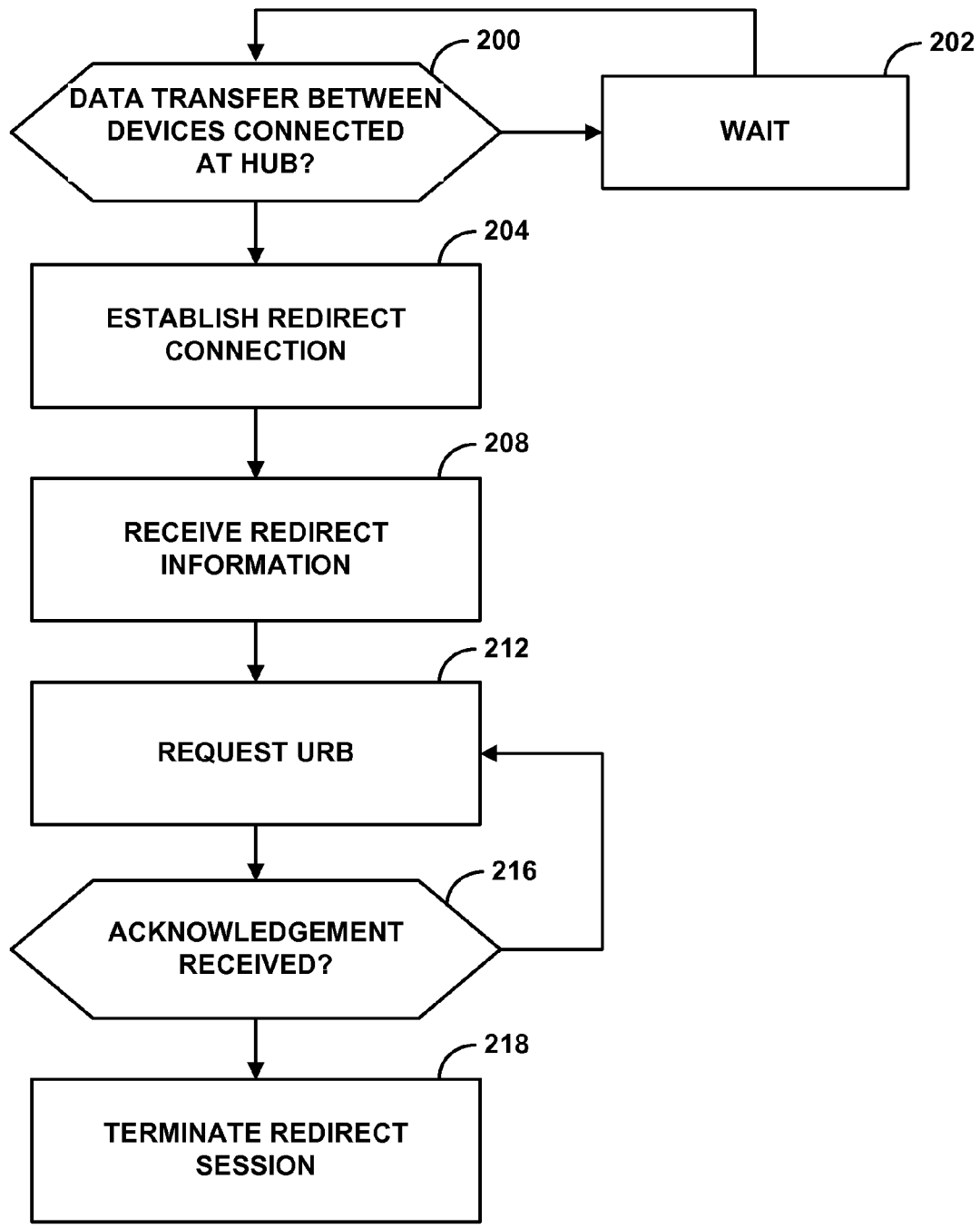
FIG. 10 is a flowchart illustrating an example communication redirect according to aspects of this disclosure.

FIG. 10 is a flowchart illustrating an example communication redirect according to aspects of this disclosure. For example, FIG. 10 generally illustrates a host device conducting a redirect session to redirect data transfer between devices connected to a hub without transferring the data through the host device, according to aspects of this disclosure. In some examples, the host device may be configured in a manner similar to that described with respect to WSB host 80 shown in the example of FIG. 5.

In the example of FIG. 10, the host device determines whether data is being transferred between devices connected to the hub (200). For example, the host device may recognize devices as they are connected to the hub, and may determine whether the devices are suitable for a redirect session (e.g., by maintaining a list of approved devices), as described in this disclosure. If there are no devices connect (or the devices are not approved for data redirect), the host device may continue to wait until such device are connected (202).

Upon compatible devices being connected, the host device may establish a redirect connection at the hub (204). For example, an application and a redirect client at the host device may communicate with a redirect server at the hub to establish a redirect connection. In some examples, the host device may also receive redirect information from the hub (e.g., the redirect server at the hub), thereby establishing a link between the devices connected to the hub.

The host device may then request data to be transferred between the devices using a URB message (208). For example, the redirect client at the host device may generate a URB message as if the URB message came from a device driver at the host device. The host device may also wait for an acknowledgement message, which may indicate that data was successfully transferred between the devices connected to the hub (212). The host device may continue requesting data (the "yes" branch of step 216) as long as acknowledgement messages are received.

When an acknowledgement message is not received (the "no" branch of step 216), the host device may terminate the redirect session (218). For example, the redirect client may send a message to the redirect server at the hub indicating that the redirect session has concluded. It should also be understood that the steps shown and described with respect to FIG. 10 are provided as merely one example. That is, the steps of the method of FIG. 10 need not necessarily be performed in the order shown in FIG. 10, and fewer, additional, or alternative steps may be performed.

Figure 11:
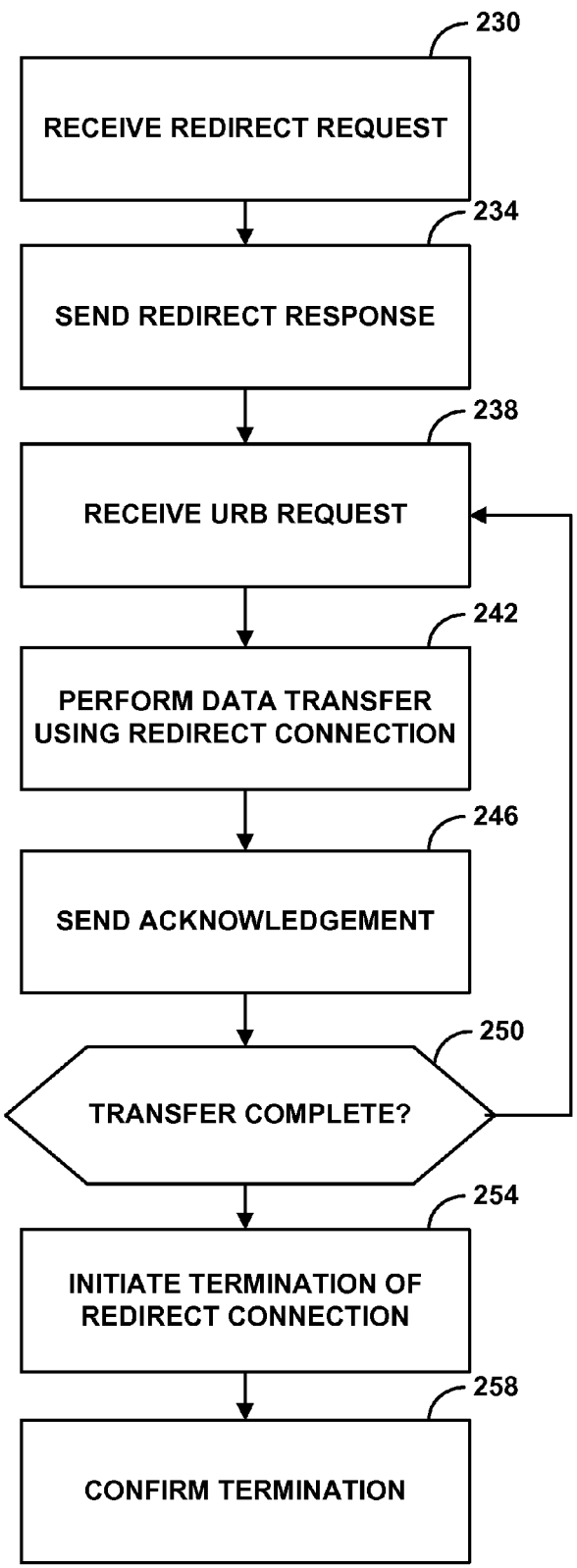
FIG. 11 is a flowchart illustrating another example communication redirect according to aspects of this disclosure.

FIG. 11 is a flowchart illustrating another example communication redirect according to aspects of this disclosure. For example, FIG. 11 generally illustrates a redirect server conducting a redirect session to redirect data transfer between devices connected to a hub without transferring the data through a host device, according to aspects of this disclosure. In some examples, the redirect server may be configured in a manner similar to that described with respect to WSB host 96 shown in the example of FIG. 5. The redirect server may be incorporated into a hub, or may be a standalone device communicating the hub.

In any case, in the example of FIG. 11, the redirect server receives a request to conduct a redirect session (230). The redirect server may receive the request from a host device (e.g., a redirect client at the host device). The redirect server may then send a redirect response to establish a redirect connection between the device connected to the hub (234). The response, in some instances, may indicate the manner in which the devices are connected to the hub (e.g., the port addresses of the ports to which the devices are connected, and the like).

The redirect server may also receive a URB request to transfer data between the devices connected to the hub (238). Upon receiving the URB message, the redirect server may perform a data transfer using the previously established redirect connection between the devices connected to the hub (242). After the data transfer is complete, the redirect server may send an acknowledgement message indicating that the data has been transferred (246).

In some examples, the redirect server may also determine when data transfer is complete (250). For example, the redirect server may receive data from the devices connected to the hub (and/or device drivers at the host device) indicating the amount of data being transferred (or some other metric associated with the data transfer). In this example, the redirect server may identify when the transfer of data between the devices connected to the hub is complete. If the data transfer is not complete (the "no" branch of step 250), the redirect server will wait to receive another URB request (238). If, however, the data transfer is complete (the "yes" branch of step 250), the redirect server may initiate termination of the redirect connection (254). For example, the redirect server may send a negative acknowledgement message to the host device indicating that there is no data to be transferred between the devices. In some instances, the redirect server may also send a confirmation when the redirect session is complete (258).

It should also be understood that the steps shown and described with respect to FIG. 11 are provided as merely one example. That is, the steps of the method of FIG. 11 need not necessarily be performed in the order shown in FIG. 11, and fewer, additional, or alternative steps may be performed.

As noted above, while certain techniques of this disclosure are generally described with respect to USB standards, it should be understood that USB standards are only examples of a communication standard that may be consistent with this disclosure. Thus, although the techniques are described in the context of USB standards, other similar communication standards (e.g., an IEEE 1394 standard (known as "FireWire"), an Ethernet standard, a Serial Advanced Technology Attachment standard, a high-definition multimedia interface (HDMI) standard, and a Thunderbolt standard) or even future communication standards or techniques may likewise benefit from the teaching of this disclosure.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method for transferring data, the method comprising:
    generating, at a host device, a Universal Serial Bus (USB) redirect configuration request for establishing a connection between a first USB device connected to a USB hub and a second USB device connected to the USB hub, wherein the connection between the first USB device and the second USB device does not include the host device; and
    requesting, by the host device, after the connection between the first USB device and the second USB device has been established, data to be routed from the first USB device to the second USB device via the USB hub;
    receiving, by the host device, an acknowledgement comprising an indication of a size of the data routed from the first USB device to the second USB device via the USB hub;
    sending, by the host device, data that indicates the acknowledgement to a device driver for the first device.

2. The method of claim 1, further comprising transmitting metadata associated with the data to be routed from the first USB device to the second USB device comprising characteristics of the data.

3. The method of claim 2, wherein the characteristics comprise at least one of an amount of data, a file name associated with the data, a directory in which to save the data, and a location in which to save the data.

4. The method of claim 1, wherein sending data that indicates the acknowledgement to the device driver for the first device comprises:
    generating dummy data having the size; and
    sending the dummy data to the device driver for the first device.

5. The method of claim 4, further comprising:
    receiving the dummy data from the device driver for the first device, and
    wherein requesting data to be routed from the first device to the second device is initiated upon receiving the dummy data.

6. The method of claim 1, wherein requesting comprises generating one or more USB Request Block (URB) messages comprising an indication of an amount of data to be routed between the first USB device and the second USB device.

7. The method of claim 1, further comprising receiving data associated with the first USB device and the second USB device identifying an address of the first USB device and an address of the second USB device to establish the connection between the first USB device and the second USB device.

8. The method of claim 1, further comprising determining that the first device and the second device are suitable to be connected for data transfer between the first device and the second device.

9. The method of claim 1, further comprising requesting termination the connection between the first device and the second device.

10. An apparatus for transferring data, the apparatus comprising one or more processors configured to:
    generate a Universal Serial Bus (USB) redirect configuration request for establishing a connection between a first USB device connected to a USB hub and a second USB device connected to the USB hub, wherein the connection between the first USB device and the second USB device does not include the host device; and
    request, by the host device, after the connection between the first USB device and the second USB device has been established, data to be routed from the first USB device to the second USB device via the USB hub;
    receive, by the host device, an acknowledgement comprising an indication of a size of the data routed from the first USB device to the second USB device via the USB hub;
    send, by the host device, data that indicates the acknowledgement to a device driver for the first device.

11. The apparatus of claim 10, wherein the one or more processors are further configured to transmit metadata associated with the data to be routed from the first USB device to the second USB device comprising characteristics of the data.

12. The apparatus of claim 11, wherein the characteristics comprise at least one of an amount of data, a file name associated with the data, a directory in which to save the data, and a location in which to save the data.

13. The apparatus of claim 10, wherein to send data that indicates the acknowledgement to the device driver for the first device, the one or more processors are further configured to:
    generate dummy data having the size; and
    send the dummy data to the device driver for the first device.

14. The apparatus of claim 13, wherein the one or more processors are further configured to:
    receive the dummy data from the device driver for the first device, and
    wherein the one or more processors initiate the request for data to be routed from the first device to the second device upon receiving the dummy data.

15. The apparatus of claim 10, wherein to request data to be routed, the one or more processors are configured to generate one or more USB Request Block (URB) messages comprising an indication of an amount of data to be routed between the first USB device and the second USB device.

16. The apparatus of claim 10, further comprising receiving data associated with the first USB device and the second USB device identifying an address of the first USB device and an address of the second USB device to establish the connection between the first USB device and the second USB device.

17. The apparatus of claim 10, wherein the one or more processors are further configured to determine that the first device and the second device are suitable to be connected for data transfer between the first device and the second device.

18. The apparatus of claim 10, wherein the one or more processors are further configured to request termination the connection between the first device and the second device.

19. An apparatus for transferring data, the apparatus comprising:
   means for generating a Universal Serial Bus (USB) redirect configuration request for establishing a connection between a first USB device connected to a USB hub and a second USB device connected to the USB hub, wherein the connection between the first USB device and the second USB device does not include the host device; and
   means for requesting, by the host device, after the connection between the first USB device and the second USB device has been established, data to be routed from the first USB device to the second USB device via the USB hub;
   means for receiving, by the host device, an acknowledgement comprising an indication of a size of the data routed from the first USB device to the second USB device via the USB hub;
   means for sending, by the host device, data that indicates the acknowledgement to a device driver for the first device.

20. The apparatus of claim 19, further comprising means for transmitting metadata associated with the data to be routed from the first USB device to the second USB device comprising characteristics of the data.

21. The apparatus of claim 19, wherein the means for sending data that indicates the acknowledgement to the device driver for the first device comprises:
   means for generating dummy data having the size; and
   means for sending the dummy data to the device driver for the first device.

22. The apparatus of claim 21, further comprising:
   means for receiving the dummy data from the device driver for the first device, and
   wherein means for requesting data to be routed from the first device to the second device is initiated upon receiving the dummy data.

23. The apparatus of claim 19, wherein means for requesting comprises means for generating one or more USB Request Block (URB) messages comprising an indication of an amount of data to be routed between the first USB device and the second USB device.

24. The apparatus of claim 19, further comprising means for determining that the first device and the second device are suitable to be connected for data transfer between the first device and the second device.

25. A non-transitory computer-readable medium storing instructions that, when executed, cause one or more processors to:
   generate a Universal Serial Bus (USB) redirect configuration request for establishing a connection between a first USB device connected to a USB hub and a second USB device connected to the USB hub, wherein the connection between the first USB device and the second USB device does not include the host device; and
   request, by the host device, after the connection between the first USB device and the second USB device has been established, data to be routed from the first USB device to the second USB device via the USB hub;
   receive, by the host device, an acknowledgement comprising an indication of a size of the data routed from the first USB device to the second USB device via the USB hub;
   send, by the host device, data that indicates the acknowledgement to a device driver for the first device.

26. The non-transitory computer-readable medium of claim 25, further comprising instructions that cause the one or more processors to transmit metadata associated with the data to be routed from the first USB device to the second USB device comprising characteristics of the data.

27. The non-transitory computer-readable medium of claim 25, wherein to send data that indicates the acknowledgement to the device driver for the first device, the instructions cause the one or more processors to:
   generate dummy data having the size; and
   send the dummy data to the device driver for the first device.

28. The non-transitory computer-readable medium of claim 27, further comprising instructions that cause the one or more processors to:
   receive the dummy data from the device driver for the first device, and
   wherein the request for data to be routed from the first device to the second device is initiated upon receiving the dummy data.

29. The non-transitory computer-readable medium of claim 25, wherein to request data to be routed, the instructions that cause the one or more processors to generate one or more USB Request Block (URB) messages comprising an indication of an amount of data to be routed between the first USB device and the second USB device.

30. The non-transitory computer-readable medium of claim 25, further comprising instructions that cause the one or more processors to determine that the first device and the second device are suitable to be connected for data transfer between the first device and the second device.

31. A method for transferring data, the method comprising:
   generating a Universal Serial Bus (USB) redirect configuration message for transmission to a USB host and establishing a connection between a first USB device and a second USB device that does not include the USB host based on the USB redirect configuration message;
   receiving a request to transfer data between the first USB device and the second USB device using the established connection;
   transmitting, after receiving the request, data between the first USB device and the second USB device using the connection and without transferring at least a portion of the data to the USB host; and
   sending, to the USB host, an acknowledgement comprising an indication of a size of the data routed from the first USB device to the second USB device via the USB hub.

32. The method of claim 31, further comprising receiving metadata associated with the data to be transferred between the first USB device to the second USB device comprising characteristics of the data.

33. The method of claim 32, wherein the characteristics comprise at least one of an amount of data, a file name associated with the data, a directory in which to save the data, and a location in which to save the data.

34. The method of claim 31, further comprising:
   receiving, prior to transmitting the data between the first USB device and the second USB device, a redirect trigger based on the acknowledgement, such that sending the acknowledgement occurs prior to transmitting the data between the first USB device and the second USB device.

35. The method of claim 31, wherein receiving the request comprises receiving a USB Request Block (URB) message comprising an indication of an amount of data to be transferred between the first USB device and the second USB device.

36. The method of claim 31, further comprising transmitting data associated with the first USB device and the second USB device to the USB host that identifies an address of the first USB device and an address of the second USB device.

37. The method of claim 31, further comprising terminating the connection between the first device and the second device.

38. An apparatus for transferring data, the apparatus comprising one or more processors configured to:
generate a Universal Serial Bus (USB) redirect configuration message for transmission to a USB host and establish a connection between a first USB device and a second USB device that does not include the USB host based on the USB redirect configuration message;
receive a request to transfer data between the first USB device and the second USB device using the established connection;
transmit, after receiving the request, data between the first USB device and the second USB device using the connection and without transferring at least a portion of the data to the USB host; and
sending, to the USB host, an acknowledgement comprising an indication of a size of the data routed from the first USB device to the second USB device via the USB hub.

39. The apparatus of claim 38, wherein the one or more processors are further configured to receive metadata associated with the data to be transferred between the first USB device to the second USB device comprising characteristics of the data.

40. The apparatus of claim 39, wherein the characteristics comprise at least one of an amount of data, a file name associated with the data, a directory in which to save the data, and a location in which to save the data.

41. The apparatus of claim 38, wherein the one or more processors are further configured to:
receive, prior to transmitting the data between the first USB device and the second USB device, a redirect trigger based on the acknowledgement, such that sending the acknowledgement occurs prior to transmitting the data between the first USB device and the second USB device.

42. The apparatus of claim 38, wherein to receive the request, the one or more processors are configured to receive a USB Request Block (URB) message comprising an indication of an amount of data to be transferred between the first USB device and the second USB device.

43. The apparatus of claim 38, wherein the one or more processors are further configured to transmit data associated with the first USB device and the second USB device to the USB host that identifies an address of the first USB device and an address of the second USB device.

44. The apparatus of claim 38, wherein the one or more processors are further configured to terminate the connection between the first device and the second device.

45. An apparatus for transferring data, the apparatus comprising:
means for generating a Universal Serial Bus (USB) redirect configuration message for transmission to a USB host and establishing a connection between a first USB device and a second USB device that does not include the USB host based on the USB redirect configuration message;
means for receiving a request to transfer data between the first USB device and the second USB device using the established connection;
means for transmitting, after receiving the request, data between the first USB device and the second USB device using the connection and without transferring at least a portion of the data to the USB host; and
means for sending, to the USB host, an acknowledgement comprising an indication of a size of the data routed from the first USB device to the second USB device via the USB hub.

46. The apparatus of claim 45, further comprising means for receiving metadata associated with the data to be transferred between the first USB device to the second USB device comprising characteristics of the data.

47. The apparatus of claim 45, further comprising:
means for receiving, prior to transmitting the data between the first USB device and the second USB device, a redirect trigger based on the acknowledgement, such that sending the acknowledgement occurs prior to transmitting the data between the first USB device and the second USB device.

48. The apparatus of claim 45, wherein the means for receiving the request comprise means for receiving a USB Request Block (URB) message comprising an indication of an amount of data to be transferred between the first USB device and the second USB device.

49. The apparatus of claim 45, further comprising means for transmitting data associated with the first USB device and the second USB device to the USB host that identifies an address of the first USB device and an address of the second USB device.

50. A non-transitory computer-readable medium storing instructions that, when executed, cause one or more processors to:
generate a Universal Serial Bus (USB) redirect configuration message for transmission to a USB host and establish a connection between a first USB device and a second USB device that does not include the USB host based on the USB redirect configuration message;
receive a request to transfer data between the first USB device and the second USB device using the established connection;
transmit, after receiving the request, data between the first USB device and the second USB device using the connection and without transferring at least a portion of the data to the USB host; and
send, to the USB host, an acknowledgement comprising an indication of a size of the data routed from the first USB device to the second USB device via the USB hub.

51. The non-transitory computer-readable medium of claim 50, further comprising instructions that cause the one or more processors to receive metadata associated with the data to be transferred between the first USB device to the second USB device comprising characteristics of the data.

52. The non-transitory computer-readable medium of claim 50, further comprising:
instructions that cause the one or more processors to receive, prior to transmitting the data between the first USB device and the second USB device, a redirect trigger based on the acknowledgement, such that sending the acknowledgement occurs prior to transmitting the data between the first USB device and the second USB device.

53. The non-transitory computer-readable medium of claim 50, wherein the instructions for causing the one or more processors to receive the request comprise instructions that cause the one or more processors to receive a USB Request Block (URB) message comprising an indication of an amount of data to be transferred between the first USB device and the second USB device.

54. The non-transitory computer-readable medium of claim 50, further comprising instructions that cause the one or more processors to transmit data associated with the first USB device and the second USB device to the USB host that identifies an address of the first USB device and an address of the second USB device.

* * * * *